US012706731B1

(12) United States Patent
Wu et al.

(10) Patent No.: US 12,706,731 B1
(45) Date of Patent: Aug. 11, 2026

(54) ROBUST LINK SYNCHRONIZATION IN ETHERNET NETWORKS

(71) Applicant: Marvell Asia Pte Ltd, Singapore (SG)

(72) Inventors: Xing Wu, Palo Alto, CA (US); Shaoan Dai, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 590 days.

(21) Appl. No.: 18/086,300

(22) Filed: Dec. 21, 2022

Related U.S. Application Data

(60) Provisional application No. 63/292,740, filed on Dec. 22, 2021.

(51) Int. Cl.
*H04L 7/04* (2006.01)
*H04J 3/06* (2006.01)

(52) U.S. Cl.
CPC .............. *H04L 7/04* (2013.01); *H04J 3/0658* (2013.01)

(58) Field of Classification Search
CPC ................................ H04L 7/04; H04J 3/0658
USPC .......................................................... 370/503
See application file for complete search history.

(56) References Cited

U.S. PATENT DOCUMENTS 9,265,045 B2* 2/2016 Jin .......................... H04W 4/80
10,511,406 B1 12/2019 Lo
2006/0045053 A1* 3/2006 Erlich .................. H04B 1/7156 375/E1.037
2011/0305248 A1* 12/2011 Lin ..................... H04L 12/4625 370/503
2013/0080817 A1* 3/2013 Mihelic ............... H04L 43/0852 713/401
2013/0243011 A1 9/2013 Powell et al.
2014/0029935 A1 1/2014 Regan et al.
2015/0263847 A1* 9/2015 Baillargeon .......... H04L 41/064 370/216
2015/0381777 A1 12/2015 Dalmia
2016/0080533 A1* 3/2016 Jeon ........................ H04L 12/66 370/402
2020/0052877 A1 2/2020 Tu et al.
2021/0243713 A1* 8/2021 Ellenbeck ........... H04W 56/002
2022/0104220 A1* 3/2022 Huang .................. H04W 8/005

OTHER PUBLICATIONS

Axer et al., "802.3bp Sleep/Wake-up Specification—TC10-OPEN Sleep/Wake-up Specification for Automotive Gigabit Ethernet," Open Alliance, Jul. 28, 2021 (23 pages).

(Continued)

*Primary Examiner* — Kwang B Yao
*Assistant Examiner* — Syed M Bokhari

(57) ABSTRACT

A first network interface device receives a first synchronization signal transmitted by a second network interface device via a communication link. The first synchronization signal is for synchronizing the first network interface device and the second network interface device via the communication link. In response to detecting the first synchronization signal from the second network interface device, the first network interface device starts a timer that is configured to expire after transmission of the first synchronization signal by the second network interface device has ended. In response to the timer expiring, the first network interface device transmits a synchronization response signal to the second network interface device.

20 Claims, 10 Drawing Sheets

(56) References Cited

OTHER PUBLICATIONS

Cherubini et al., "100BASE-T2: 100 Mbit/s Ethernet over Two Pairs of Category-3 Cabling," IEEE Proceedings of ICC'97—International Conference on Communications, 1997 (5 pages).
Aboubacar et al., "Improved Clock Synchronization Start-Up Time for Ethernet AVB-based In-Vehicle Networks," 2015 IEEE 20th Conf. on Emerging Technologies & Factory Automation (ETFA), IEEE, Sep. 8, 2015 (8 pages).
Hatamian et al., "Design Considerations for Gigabit Ethernet 1000Base-T Twisted Pair Transceivers," IEEE 1998 Custom Integrated Circuits Conference, 1998 (8 pages).
IEEE Std 802.3ch-2020 "IEEE Standard for Ethernet—Amendment 8: Physical Layer Specifications and Management Parameters for 2.5 GB/s, 5 GB/s, and 10 GB/s Automotive Electrical Ethernet," IEEE Computer Society, pp. 1-207 (Jun. 30, 2020).

* cited by examiner

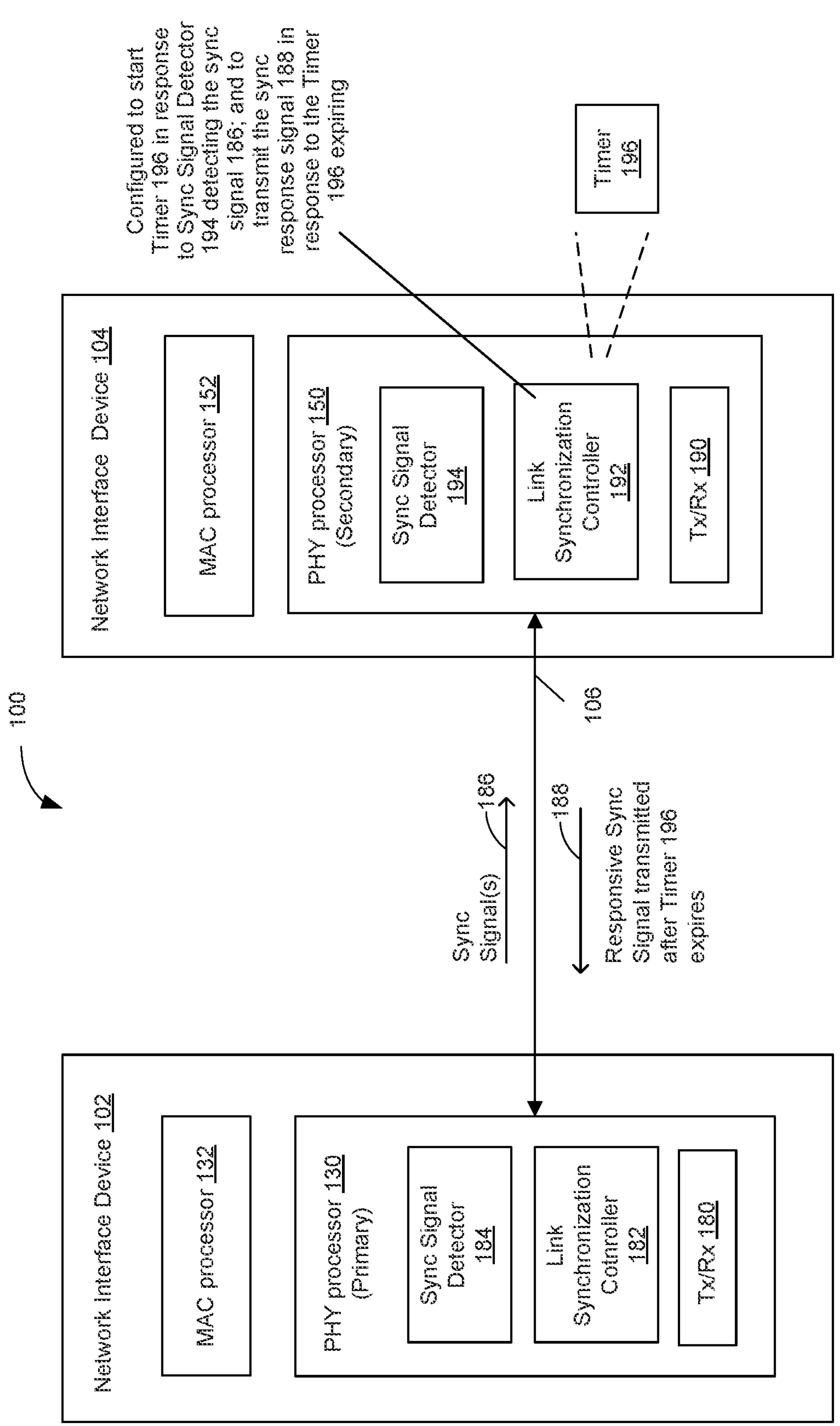
FIG. 1
100
Network Interface Device 102
MAC processor 132
PHY processor 130 (Primary)
Sync Signal Detector 184
Link Synchronization Cotnroller 182
Tx/Rx 180
Sync Signal(s)
186
188
Responsive Sync Signal transmitted after Timer 196 expires
106
Network Interface Device 104
MAC processor 152
PHY processor 150 (Secondary)
Sync Signal Detector 194
Link Synchronization Controller 192
Tx/Rx 190
Configured to start Timer 196 in response to Sync Signal Detector 194 detecting the sync signal 186; and to transmit the sync response signal 188 in response to the Timer 196 expiring
Timer 196

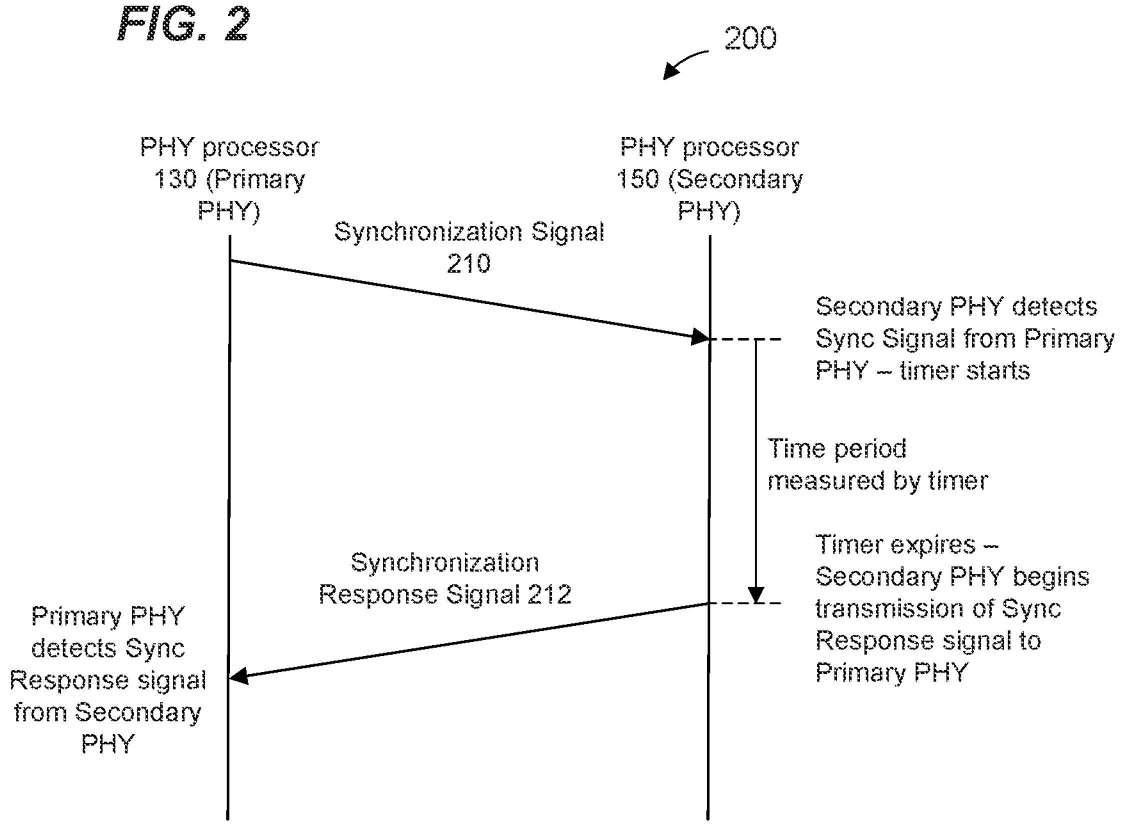
FIG. 2
200
PHY processor 130 (Primary PHY)
PHY processor 150 (Secondary PHY)
Synchronization Signal 210
Secondary PHY detects Sync Signal from Primary PHY – timer starts
Time period measured by timer
Timer expires – Secondary PHY begins transmission of Sync Response signal to Primary PHY
Synchronization Response Signal 212
Primary PHY detects Sync Response signal from Secondary PHY

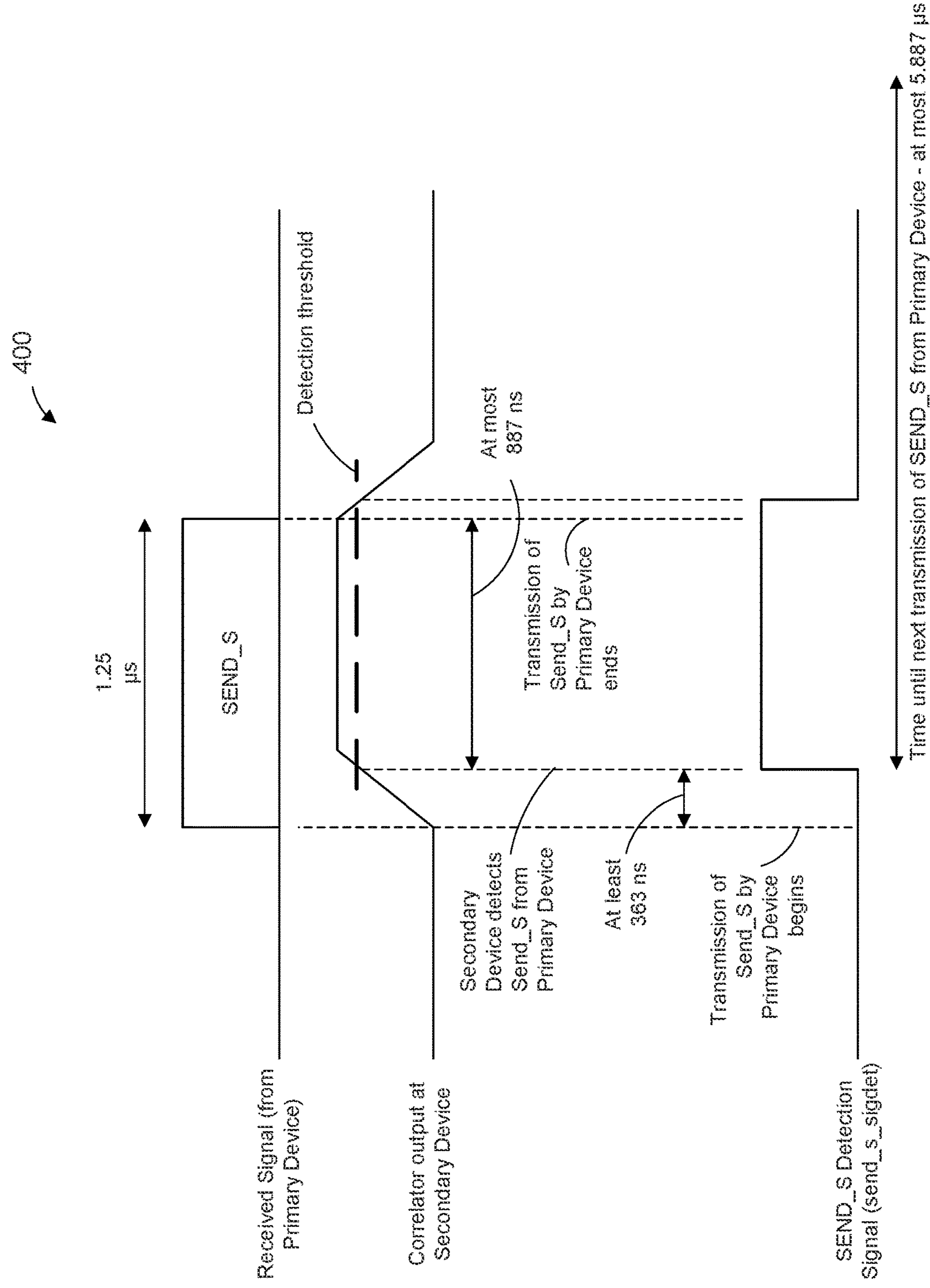
FIG. 4
400
Received Signal (from Primary Device)
Correlator output at Secondary Device
SEND_S Detection Signal (send_s_sigdet)
1.25 µs
SEND_S
Detection threshold
At most 887 ns
Transmission of Send_S by Primary Device ends
Secondary Device detects Send_S from Primary Device
At least 363 ns
Transmission of Send_S by Primary Device begins
Time until next transmission of SEND_S from Primary Device - at most 5.887 µs 500
Noise and/or interference
Detection threshold
1.25 µs
SEND_S
Transmission of Send_S by Primary Device ends
Secondary Device detects Send_S from Primary Device
Transmission of Send_S by Primary Device begins
Received Signal (from Primary Device)
Correlator output at Secondary Device
SEND_S Detection Signal (send_s_sigdet)

300
Transmit Disable 308
Tx_Send_S 312a
SIGDET_WAIT 316a
Tx_Send_S 312x
SIGDET_WAIT 316x
Tx_Send_S 312y
SIGDET_WAIT 316y
1.25 µs
5 µs
604
Transmit Disable 352
SIGDET_WAIT 354
Silent Wait 608
Tx_Send_S 358
PAUSE 360
Secondary Device detects Send_S from Primary Device
1 µs
1.25 µs

*FIG. 7*

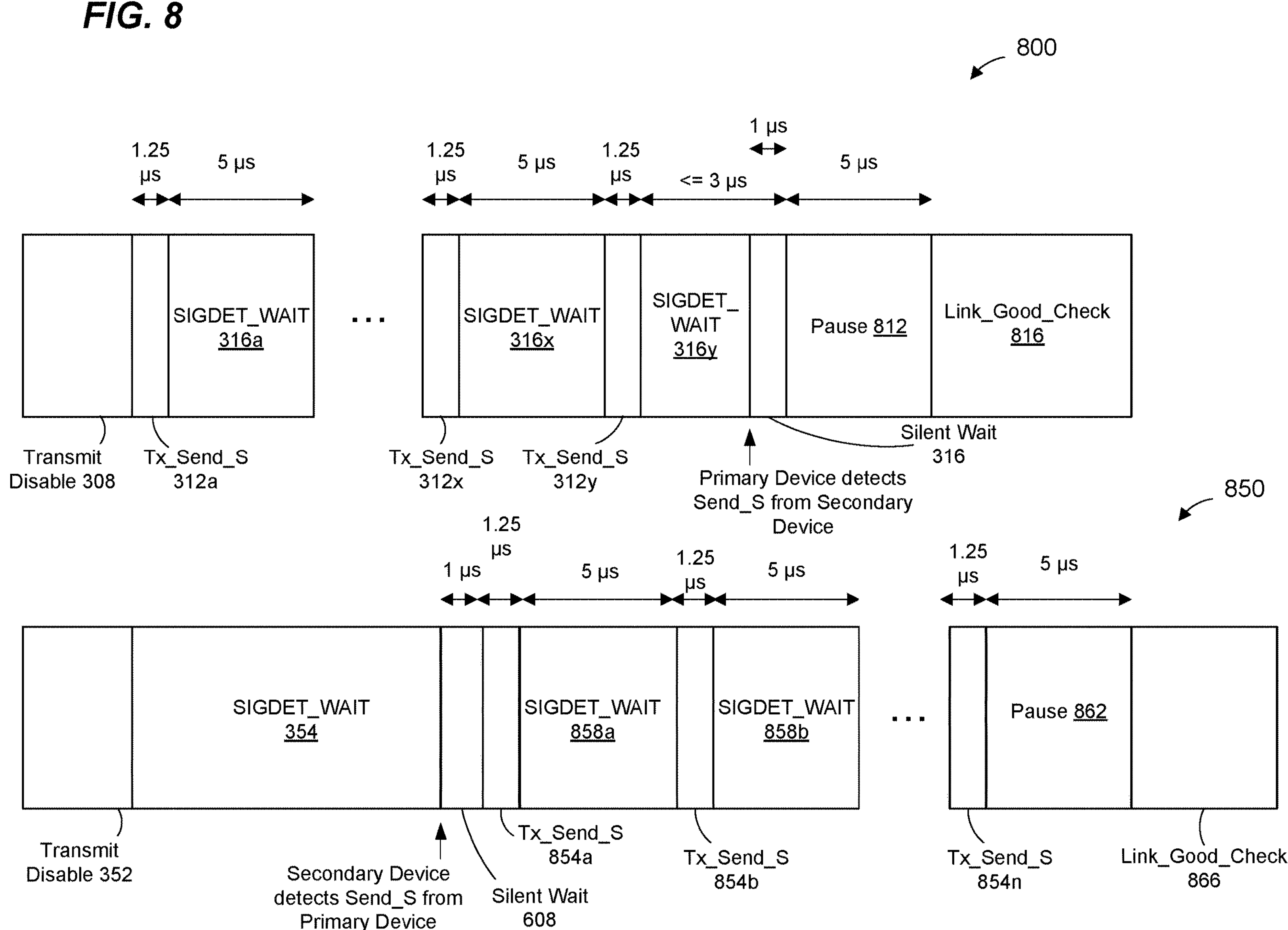
FIG. 8
800
1.25 µs
5 µs
1.25 µs
5 µs
1.25 µs
<= 3 µs
1 µs
5 µs
SIGDET_WAIT 316a
...
SIGDET_WAIT 316x
SIGDET_WAIT 316y
Pause 812
Link_Good_Check 816
Transmit Disable 308
Tx_Send_S 312a
Tx_Send_S 312x
Tx_Send_S 312y
Primary Device detects Send_S from Secondary Device
Silent Wait 316
850
1 µs
1.25 µs
5 µs
1.25 µs
5 µs
1.25 µs
5 µs
SIGDET_WAIT 354
SIGDET_WAIT 858a
SIGDET_WAIT 858b
...
Pause 862
Transmit Disable 352
Secondary Device detects Send_S from Primary Device
Silent Wait 608
Tx_Send_S 854a
Tx_Send_S 854b
Tx_Send_S 854n
Link_Good_Check 866

Figure 9:
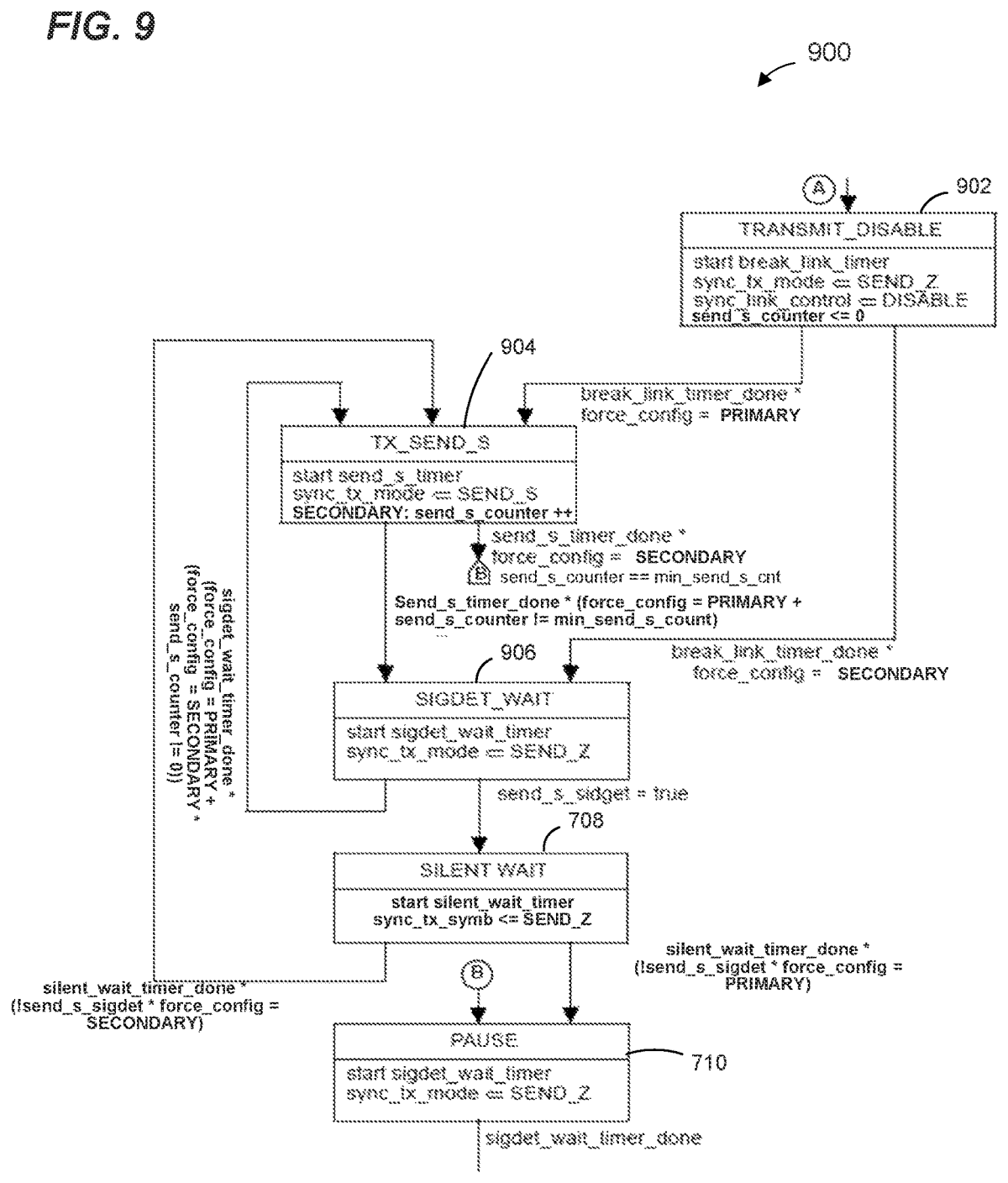

TRANSMIT_DISABLE start break_link_timer
sync_tx_mode <= SEND_Z
sync_link_control <= DISABLE
send_s_counter <= 0

904 break_link_timer_done *
force_config = PRIMARY

TX_SEND_S start send_s_timer
sync_tx_mode <= SEND_S
SECONDARY: send_s_counter ++ send_s_timer_done *
force_config = SECONDARY
B send_s_counter == min_send_s_cnt

Send_s_timer_done * (force_config = PRIMARY +
send_s_counter != min_send_s_count)

sigdet_wait_timer_done *
(force_config = PRIMARY +
(force_config = SECONDARY *
send_s_counter != 0))

906 break_link_timer_done *
force_config = SECONDARY

SIGDET_WAIT start sigdet_wait_timer
sync_tx_mode <= SEND_Z send_s_sidget = true

708

SILENT WAIT start silent_wait_timer
sync_tx_symb <= SEND_Z silent_wait_timer_done *
(!send_s_sigdet * force_config =
SECONDARY)

B silent_wait_timer_done *
(!send_s_sigdet * force_config =
PRIMARY)

PAUSE

710 start sigdet_wait_timer
sync_tx_mode <= SEND_Z sigdet_wait_timer_done

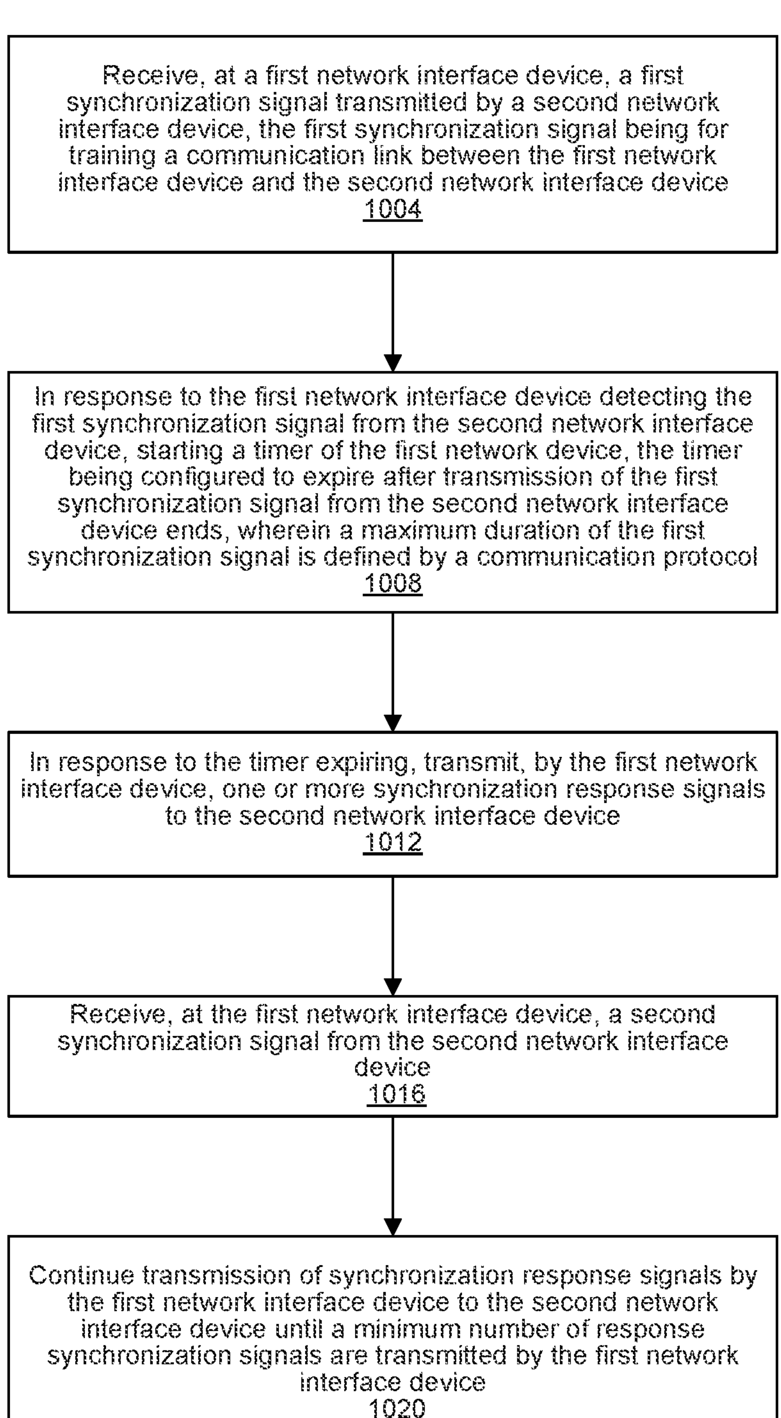
FIG. 10
1000
Receive, at a first network interface device, a first synchronization signal transmitted by a second network interface device, the first synchronization signal being for training a communication link between the first network interface device and the second network interface device
1004
In response to the first network interface device detecting the first synchronization signal from the second network interface device, starting a timer of the first network device, the timer being configured to expire after transmission of the first synchronization signal from the second network interface device ends, wherein a maximum duration of the first synchronization signal is defined by a communication protocol
1008
In response to the timer expiring, transmit, by the first network interface device, one or more synchronization response signals to the second network interface device
1012
Receive, at the first network interface device, a second synchronization signal from the second network interface device
1016
Continue transmission of synchronization response signals by the first network interface device to the second network interface device until a minimum number of response synchronization signals are transmitted by the first network interface device
1020

ROBUST LINK SYNCHRONIZATION IN ETHERNET NETWORKS

CROSS REFERENCES TO RELATED APPLICATIONS

This application claims the benefit of U.S. Provisional Patent Application No. 63/292,740, entitled "Enhancing Robustness of Link Synchronization in Automotive Ethernet at 802.3cy-Part II," filed on Dec. 22, 2021, which is hereby incorporated herein by reference in its entirety.

FIELD OF TECHNOLOGY

The present disclosure relates generally to Ethernet communication systems, and more particularly to synchronization between network devices in an Ethernet communication system operating in a noisy environment.

BACKGROUND

Modern vehicles, such as advanced automobiles, have begun using automotive Ethernet technologies to connect components over a wired physical network within the vehicle. One important requirement for an automotive Ethernet network is a start-up time of the components of the Ethernet network. Typically, vehicle network components are required to be linked-up and operational within a certain period of time after start-up of the vehicle, for example within a hundred or several hundreds of milliseconds after start-up of the vehicle, to allow the vehicle to be fully operational within a certain time, such as within no more than two seconds, after start-up of the vehicle. A link-up process in a typical automotive application includes a synchronization stage followed by a training stage. During the synchronization stage, a device that is operating as a primary device sequentially transmits one or more synchronization signals with transmission pauses separating respective transmissions of the synchronization signals. When a device operating as a secondary device detects a synchronization signal transmitted by the primary device, the secondary device transmits a synchronization response signal to the primary device. After the primary device detects the synchronization response signal from the secondary device, the primary device stops transmission of its synchronization signals to the secondary device. Once this exchange of synchronization signals between the primary device and the secondary device is completed, the primary device initiates the training stage of the link up process by transmitting a training signal to the secondary device.

SUMMARY

In an embodiment, a method for synchronizing a first network interface device and a second network interface device via a communication link includes: receiving, at the first network interface device, a first synchronization signal transmitted by the second network interface device, the first synchronization signal being for synchronizing the first network interface device and the second network interface device via the communication link; in response to detecting the first synchronization signal from the second network interface device, starting a timer of the first network interface device, the timer being configured to expire after transmission of the first synchronization signal by the second network interface device has ended; and in response to the timer expiring, transmitting, by the first network interface device, a synchronization response signal to the second network interface device.

In another embodiment, a communication device comprises: a first network interface device configured to communicatively couple with a second network interface device via a communication link, the first network interface device including a physical layer (PHY) processor, implemented at least partially on one or more integrated circuit (IC) chips. The PHY processor includes a timer implemented on the one or more IC chips. The one or more IC chips are configured to: receive a first synchronization signal transmitted by the second network interface device, the first synchronization signal being for synchronizing the first network interface device and the second network interface device via the communication link; in response to detecting the first synchronization signal from the second network interface device, start the timer of the first network interface device, the timer being configured to expire after transmission of the first synchronization signal by the second network interface device has ended; and in response to the timer expiring, control the first network interface device to transmit a synchronization response signal to the second network interface device.

BRIEF DESCRIPTION OF THE DRAWINGS

FIG. 1 is a block diagram of an example system in which a first network device starts a timer in response to detecting a synchronization signal from a second network interface device and transmits a synchronization response signal in response to the timer expiring, according to an embodiment.

FIG. 2 is an example timing diagram of a synchronization signal exchange sequence performed during a synchronization phase of link establishment between the first network device and the second network device of FIG. 1, according to an embodiment.

FIG. 4 is a timing diagram illustrating an example of generating a detection signal at a first network interface device in connection with reception of a synchronization signal from a second network interface device.

FIG. 7 is a state transition diagram illustrating example states and state transitions for operation during a synchronization procedure performed by a network interface device, according to another embodiment.

FIG. 8 is a timing/state transition diagram illustrating another example link establishment process, according to another embodiment.

FIG. 9 is a state transition diagram illustrating example states and state transitions for operation during a synchronization procedure performed by a network interface device, according to another embodiment.

FIG. 10 is a flow diagram of an example method for synchronizing the first network device and the second network device via the communication link of FIG. 1, according to an embodiment.

DETAILED DESCRIPTION

Figure 3:
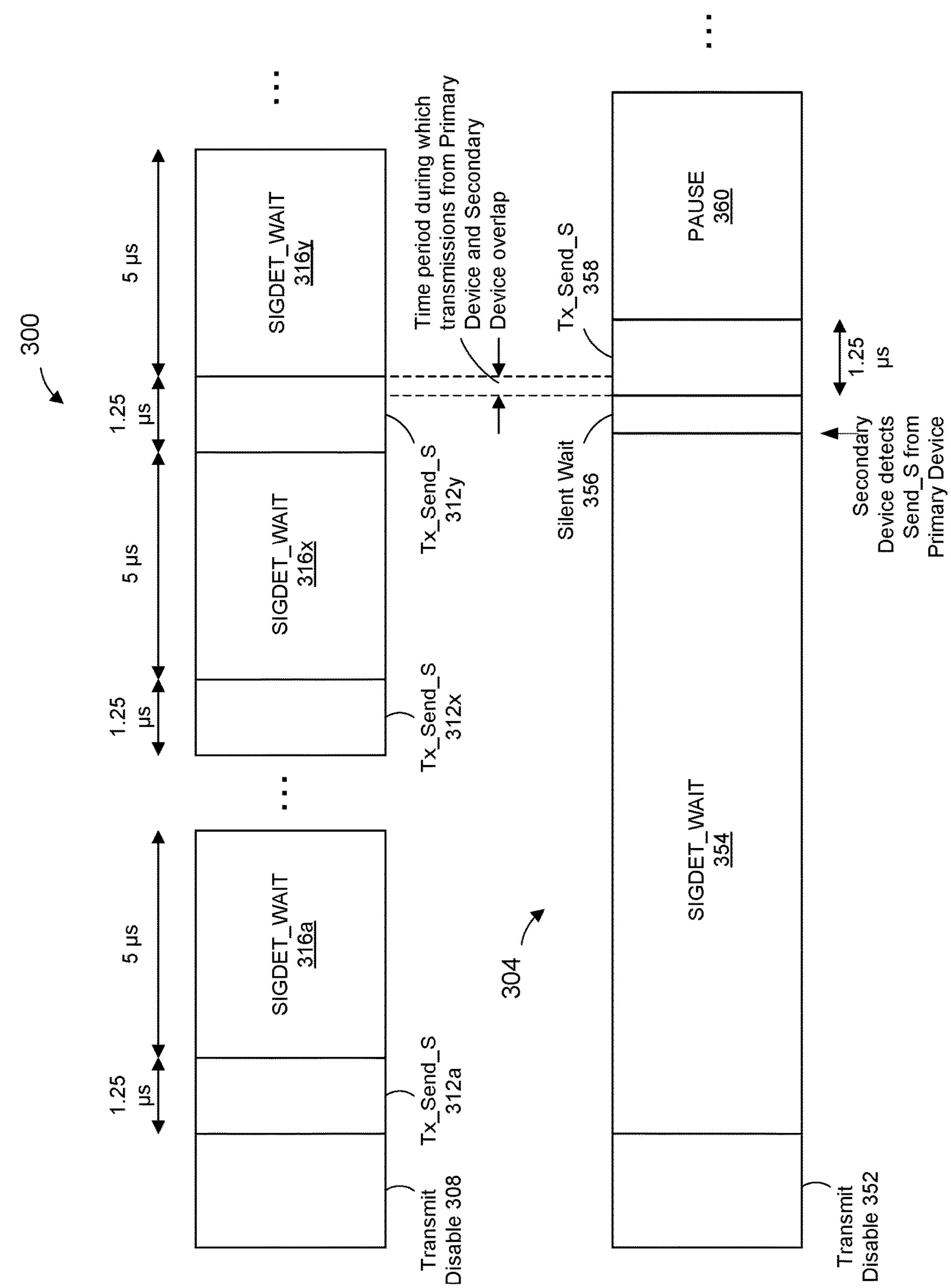
FIG. 3 is a timing/state diagram illustrating a problem that may occur during a link establishment process as proposed for the IEEE 802.3cy automotive Ethernet standard, which is now in development.

In various embodiments described below, link establishment between a first network device (e.g., a primary device) and a second network device (e.g., a secondary device) in an Ethernet network includes the primary device transmitting a first synchronization signal to the secondary device. In response to the secondary device detecting the first synchronization signal, the secondary device transmits a second synchronization signal to the primary device. The link establishment also includes the primary device detecting the second synchronization signal from the secondary device. To avoid the secondary device starting transmission of the second synchronization signal before the primary device has completed transmitting the first synchronization signal, which may lead to the primary device failing to detect the second synchronization signal, the secondary device waits a determined time period after detecting the first synchronization signal before starting transmission of the second synchronization signal, according to some embodiments.

FIG. 1 is a block diagram of an example communication network 100 in which a first communication device (e.g., a primary device) and a second communication device (e.g., a secondary device) communicate via a communication link (e.g., an Ethernet communication link), according to an embodiment. The communication network 100 includes a first network interface device 102 coupled to a second network interface device 104 via a communication link 106. In an embodiment, the first network interface device 102 and the second network interface device 104 are generally configured to operate according to an automotive Ethernet standard, such as an IEEE 802.3 standard. In another embodiment, the first network interface device 102 and the second network interface device 104 are generally configured to operate according to one or more other suitable communication protocols.

The first network interface device 102 and the second network interface devices 104 are associated with electronic devices of an automotive network system, in an embodiment. As just an illustrative example, the first network interface device 102 is a component of, or coupled to, a central controller (including a central processing unit) in an automobile, and the second network interface device 104 is a component of or coupled to an accessory device, such as a camera or a telematics radio device, in the automobile, in an embodiment. In other embodiments, the first network interface device 102 and/or the second network interface device 104 are associated with other suitable electronic devices in an automobile, such as an infotainment device, a sensor device (e.g., a lidar device, a radar, an audio sensor, a video sensor, a proximity sensor, etc., a control device, etc. in the automobile. The network link 106 between the network interface device 102 and the network interface device 104 comprises a single twisted pair copper link, in an embodiment. In another embodiment, the network link 106 is a suitable link different from a single twisted pair copper link. For example, the network link 106 is a multi-pair copper link, an optical link, a fiber link, a radio frequency plastic waveguide link, etc., in various embodiments. In some embodiments, the first network interface device 102 and the second network interface device 104 are utilized in a suitable network other than an automotive network. For example, in some embodiments, the first network interface device 102 and the second network interface device 104 are utilized in an industrial control network or process plant network.

The network interface device 102 includes one or more physical layer (PHY) processors 130 (sometimes referred to herein as "the PHY processor 130" for brevity). The PHY processor 130 includes a transceiver 180 configured to transmit and receive signals over the link 106. The network interface device 102 also includes one or more media access control (MAC) processors 132 (sometimes referred to herein as "the MAC processor 132" for brevity) coupled to the PHY processor 130, in an embodiment. In another embodiment, the network interface device 102 omits the MAC processor 132. For example, the MAC processor 132 is external to the network interface device 102, in an embodiment. In various embodiments in which the MAC processor 132 is external to the network interface device 102, the MAC processor 132 may be co-located on a same printed circuit board (PCB) as the PHY processor 130, or may be located on a separated PCB from the PHY processor 130.

The PHY processor 130 includes one or more encoder devices (not shown), a scrambler device (not shown), and a modulator (not shown) for encoding, scrambling, and modulating data as part of generating a transmission signal, according to an embodiment. The PHY processor 130 also includes a demodulator (not shown), a de-scrambler device (not shown), and one or more decoder devices (not shown) for demodulating, de-scrambling, and decoding as part of generating the received data, according to an embodiment. In some embodiments, the PHY processing device 130 also includes an analog to digital converter (hereinafter "ADC", not shown) that converts an analog signal received via the communication medium to a digital signal. In some embodiments, the PHY processor 130 also includes a digital signal processor (hereinafter "DSP", not shown) that processes the digital signal to generate a signal corresponding to modulation symbols that are then demodulated by the demodulator (not shown).

The network interface device 102 is implemented using one or more integrated circuit (IC) chips configured to operate as discussed below. For example, the PHY processor 130 may be implemented, at least partially, on a first IC chip, and the MAC processor 132 may be implemented, at least partially, on a second IC chip. As another example, at least a portion of the PHY processor 130 and at least a portion of the MAC processor 132 may be implemented on a single IC chip. For instance, the network interface device 102 may be implemented using a system on a chip (SoC), where the SoC includes at least a portion of the PHY processor 130 and at least a portion of the MAC processor 132. In an embodiment in which various IC chip components are implemented on different IC chips, the IC chips may be packaged together to form a single network interface device.

The network interface device 104 includes one or more physical layer (PHY) processors 150 (sometimes referred to herein as "the PHY processor 150" for brevity). The PHY processor 150 includes a transceiver 190 configured to transmit and receive signals over the link 106. The network interface device 104 also includes one or more media access control (MAC) processors 152 (sometimes referred to herein as "the MAC processor 152" for brevity) coupled to the PHY processor 150, in an embodiment. In another embodiment, the network interface device 104 omits the MAC processor 152. For example, the MAC processor 152 is external to the network interface device 104, in an embodiment. In various embodiments in which the MAC processor 152 is external to the network interface device 104, the MAC processor 152 may be co-located on a same printed circuit board (PCB) as the PHY processor 150, or may be located on a separated PCB from the PHY processor 150.

The PHY processor 150 includes one or more encoder devices (not shown), a scrambler device (not shown), and a modulator (not shown) for encoding, scrambling, and modulating data as part of generating a transmission signal, according to an embodiment. The PHY processor 150 also includes a demodulator (not shown), a de-scrambler device (not shown), and one or more decoder devices (not shown) for demodulating, de-scrambling, and decoding as part of generating the received data, according to an embodiment. In some embodiments, the PHY processor 150 also includes an analog to digital converter (hereinafter "ADC", not shown) that converts an analog signal received via the communication medium to a digital signal. In some embodiments, the PHY processor 150 also includes a digital signal processor (hereinafter "DSP", not shown) that processes the digital signal to generate a signal corresponding to modulation symbols that are then demodulated by the demodulator (not shown).

The network interface device 104 is implemented using one or more IC chips configured to operate as discussed below. For example, the PHY processor 150 may be implemented, at least partially, on a first IC chip, and the MAC processor 152 may be implemented, at least partially, on a second IC chip. As another example, at least a portion of the PHY processor 150 and at least a portion of the MAC processor 152 may be implemented on a single IC chip. For instance, the network interface device 104 may be implemented using an SoC, where the SoC includes at least a portion of the PHY processor 150 and at least a portion of the MAC processor 152. In an embodiment in which various IC components are implemented on different IC chips, the IC chips may be packaged together to form a single network interface device.

In various embodiments, a PHY processor (e.g., the PHY processor 130, 150) in the system 100 can be configured either as a primary PHY processor or a secondary PHY processor. A primary PHY processor uses a free running local clock to determine the timing of transmitter operations, in an embodiment. A secondary PHY processor recovers the clock from the signal received from the primary PHY processing device and uses the received signal to determine the timing of transmitter operations. Furthermore, the primary PHY processor and the secondary PHY processor are configured to synchronize their clocks and timing of transmitter operations during a synchronization phase before entering normal data transmission phase. In various embodiments, synchronization among sensors in an automotive network ensures that inputs from a plurality of various sensors distributed through a vehicle can be combined into an accurate comprehensive representation of events impacting the vehicle. As an example, the PHY processor 130 of the network interface device 102 (sometimes referred to herein as "primary network interface device 102") is configured as a primary PHY processor (sometimes referred to herein as "primary PHY processor 130"), and the PHY processor 150 of the network interface device 104 (sometimes referred to herein as "secondary network interface device 104") is configured as a secondary PHY processor (sometimes referred to herein as "secondary PHY processor 150"), in an embodiment.

The primary PHY processor 130 includes a link synchronization controller 182 and a synchronization signal detector 184, in an embodiment. The link synchronization controller 182 is configured to generate one or more synchronization signals 186 to enable the secondary PHY processor 150 to synchronize operations with the primary PHY processor 130, in an embodiment. The transceiver 180 is configured to transmit the one or more synchronization signals 186 to the secondary PHY processor 150 over the network link 106 during a synchronization phase of link establishment between the network interface device 102 and the network interface device 104, in an embodiment. The transceiver 180 is also configured to receive one or more synchronization signals 188 from the secondary PHY processor 150 over the network link 106 during the synchronization phase of link establishment between the network interface device 102 and the network interface device 104, in an embodiment. The synchronization signal detector 184 is configured to detect a synchronization signal 188 received from the secondary PHY processor 150, in an embodiment. For example, in an embodiment, the synchronization signal comprises a known periodic pseudorandom sequence. In an embodiment, the synchronization signal detector 184 is configured to perform correlation of a received signal with the known periodic pseudorandom sequence and determine that the received signal is a synchronization signal if the correlation result is above a detection threshold. Transmission of the synchronization signal 186 facilitates the network interface device 104 discovering the network interface device 102 during the synchronization phase of the link establishment process, and transmission of the synchronization signal 188 facilitates the network interface device 102 discovering the network interface device 104 during the synchronization phase of the link establishment process.

In an embodiment, the link synchronization controller 182 and/or the synchronization signal detector 184 is implemented by a processor configured to execute machine readable instructions stored in a memory device (not shown) such as a RAM, a ROM, a flash memory, etc. In an embodiment, the link synchronization controller 182 and/or the synchronization signal detector 184 additionally or alternatively includes hardware circuitry (e.g., one or more of correlation circuitry, a hardware state machine, etc.) that is configured to generate and/or detect synchronization signals such as described herein.

The secondary PHY processor 150 includes a link synchronization controller 192 and a synchronization signal detector 194, in an embodiment. The transceiver 190 of the secondary PHY processor 150 is configured to receive a synchronization signal 186 transmitted by the primary PHY processor 130 during the synchronization phase of link establishment between the network interface device 102 and the network interface device 104. The synchronization signal detector 194 is configured to detect a synchronization signal received from the primary PHY processor 130, in an embodiment. For example, in an embodiment, the synchronization signal comprises a known periodic pseudorandom sequence. In an embodiment, the synchronization signal detector 194 is configured to perform correlation of a received signal with the known periodic pseudorandom sequence and determine that the received signal is a synchronization signal if the correlation result is above a detection threshold.

The link synchronization controller 192 includes a timer 196. The link synchronization controller 192 is configured to start the timer 196 in response to the synchronization signal detector 194 detecting the synchronization signal 186 from the network interface device 102. The link synchronization controller 192 is configured to, in response to the timer 196 expiring, a synchronization signal 188 (sometimes referred to herein as a "synchronization response signal") to the primary PHY processor 130. As will be described further below, the timer 196 is configured to measure a time period that ensures that transmission of the synchronization response signal 188 begins only after transmission of the synchronization signal 186 by the network interface device 102 has ended, to improve a probability that the network interface device 102 detects the synchronization response signal 188.

In some embodiments, the link synchronization controller 192 is configured to transmit a fixed number of multiple synchronization response signals 188 to the primary PHY processor 130 in response to the timer 196 expiring. In an embodiment, the fixed number synchronization response signals 188 that the link synchronization controller 192 is configured to transmit is configurable and/or programmable in the secondary PHY processor 150. Transmission of multiple synchronization response signals 188 from the secondary PHY processor 150 to the primary PHY processor 130 increases the probability of detection of a synchronization signal 188 at the primary PHY processor 130, for example in the presence of transient noise on the network link 106 between the primary PHY processor 130 and the secondary PHY processor 150, in at least some embodiments.

In an embodiment, the link synchronization controller 192 and/or the synchronization signal detector 194 is implemented by a processor configured to execute machine readable instructions stored in a memory device (not shown) such as a RAM, a ROM, a flash memory, etc. In an embodiment, the link synchronization controller 192 and/or the synchronization signal detector 194 additionally or alternatively includes hardware circuitry (e.g., one or more of correlation circuitry, a hardware state machine, etc.) that is configured to generate and/or detect synchronization signals such as described herein.

FIG. 2 is an example timing diagram of a synchronization signal exchange sequence 200, according to an embodiment. The synchronization signal exchange sequence 200 is performed during a synchronization phase of a link establishment process for establishing a communication link between the network interface device 102 and second network interface device 104 of the system 100 of FIG. 1, according to an embodiment. For case of explanation, the synchronization signal exchange sequence 200 is described in the context of the system 100 of FIG. 1. In other embodiments, the synchronization signal exchange sequence 200 is utilized in a process of establishing a communication link in systems different from the system 100 of FIG. 1.

The primary PHY processor 130 of the network interface device 102 initiates the synchronization signal exchange sequence by transmitting one or more synchronization signals 210 to the secondary PHY processor 150 of the network interface device 104 over the link 106. The one or more synchronization signals 210 correspond to the one or more one or more synchronization signals 186 of FIG. 1, in an embodiment. The one or more synchronization signals 210 are generally used to synchronize operations of the secondary PHY processor 150 with the primary PHY processor 130, in an embodiment. In an embodiment, each respective synchronization signal 210 comprises a pseudorandom sequence transmitted by the maser PHY processor 130. In another embodiment, each respective synchronization signal 210 comprises a suitable synchronization signal different from a pseudorandom sequence.

The primary PHY processor 130 is configured to transmit the one or more synchronization signals 210 until the primary PHY processor 130 receives and detects a synchronization response signal from the secondary PHY processor 150, in an embodiment. The primary PHY processor 130 is configured to, in response to detecting a synchronization response signal from the secondary PHY processor 150, stop transmission of the synchronization signals 210 and transition into a state for a next phase (e.g., a training phase) of the link establishment process, such as a check link state for a link check phase of the link establishment process, in an embodiment.

In an embodiment, the secondary PHY processor 150 is in a signal detection wait mode until the secondary PHY processor 150 detects a synchronization signal 210 from the primary PHY processor 130. In response to detecting a synchronization signal 210 from the primary PHY processor 130, the secondary PHY processor 150 starts a timer. The timer is configured to measure a time period that ensures that transmission of the synchronization response signal 212 begins only after transmission of the synchronization signal 210 by the network interface device 102 has ended, to improve a probability that the network interface device 102 detects the synchronization response signal 212. For example, the link synchronization controller 192 starts the timer 196 in response to the synchronization signal detector 194 detecting the synchronization signal 210 from the network interface device 102.

In response to the timer expiring, the secondary PHY processor 150 initiates transmissions of the synchronization response signal 212 to the primary PHY processor 130, in an embodiment. For example, the link synchronization controller 192 transmits the synchronization response signal 212 to the primary PHY processor 130 in response to the timer 196 expiring. In an embodiment, the synchronization response signal 212 comprises a pseudorandom sequence transmitted by the secondary PHY processor 150. In another embodiment, each respective synchronization response signal 212 comprises a suitable synchronization signal different from a pseudorandom sequence.

Transmission of the synchronization signal 210 facilitates the network interface device 104 discovering the network interface device 102 during the synchronization phase of the link establishment process, and transmission of the synchronization signal 212 facilitates the network interface device 102 discovering the network interface device 104 during the synchronization phase of the link establishment process.

In an embodiment, the secondary PHY processor 150 transmits multiple synchronization response signals 212 to the primary PHY processor 130. For example, the secondary PHY processor 150 is configured to transmit a fixed (e.g., configurable and/or programmable) number of synchronization response signals 212 to the primary PHY processor 130. In an embodiment, transmission of multiple synchronization signals 212 from the secondary PHY processor 150 to the primary PHY processor 130 increases probability of detection of one of the synchronization response signals 212 transmitted by the secondary PHY processor 150, for example in the presence of noise on the link 106. For example, if one or more initial synchronization response signals 212 are not detected by the primary PHY processor 130 due, for example, to noise in the link 106, the primary PHY processor 130 may detect a subsequent one of the multiple synchronization response signals 212 once noise subsides on the link 106. Moreover, because upon detection of the synchronization response signal 212 the primary PHY processor 130 enters a next phase of the link establishment procedure, and is not expecting reception of a synchronization response signal from the secondary PHY processor 150, transmission of additional synchronization response signals 212 does not negatively affect operation of the primary PHY processor 130 or delay completion of link establishment, in at least some embodiments. Upon completion of transmission of the multiple synchronization response signals 212 to the primary PHY processor 130, the secondary PHY processor 150 transitions to a next phase of link establishment, such as a training phase of link establishment. The primary PHY processor 130 and the secondary PHY processor 150 are then synchronized and ready to begin the next phase of link establishment, such as the training phase of link establishment, in an embodiment.

FIG. 3 is a timing/state diagram illustrating a problem that may occur during a link establishment process as proposed for the IEEE 802.3cy automotive Ethernet standard, which is now in development. In particular, FIG. 3 illustrates a state transition sequence 300 of a primary device and a state transition sequence 304 of a secondary device during a link establishment process proposed for the IEEE 802.3cy automotive Ethernet standard.

The state transition sequence 300 begins with the primary device being in a transmit disable state 308. The primary device initiates the transmit disable state 308 upon power-up, for example. The primary device then transitions to a transmit synchronization signal (Tx_Send_S) state 312 during which the primary device transmits one or more synchronization signals (e.g., SEND_S signals) for a defined time period (e.g., proposed to be 1.25 μs±0.05 μs for the IEEE 802.3cy automotive Ethernet standard). When the Tx_Send_S state 312 ends, the primary device transitions to a signal detect wait (SigDet_Wait) state 316 during which the primary device quiets transmissions by the primary device and waits to receive a synchronization response signal from the secondary device. If the primary device does not detect a synchronization response signal from the secondary device, the primary device remains in the SigDet_Wait state 316 for a defined time period (e.g., proposed to be 5 μs±0.15 μs for the IEEE 802.3cy automotive Ethernet standard), and then transitions back to the Tx_Send_S state 312. The primary device may switch between the Tx_Send_S state 312 and the SigDet_Wait state 316 multiple times until the primary device detects a synchronization response signal from the secondary device.

If during the SigDet_Wait state 316 the primary device detects a synchronization response signal from the secondary device, then the primary device transitions to a pause state (not shown in FIG. 3) to complete the synchronization procedure. The primary device then enters a link check state (not shown in FIG. 3) to perform a link check as part of a link establishment between the primary device and the secondary device.

With continued reference to FIG. 3, similar to the state transition sequence 300 implemented by the primary device, the state transition sequence 304 implemented by the secondary device begins with the secondary device in a transmit disable state 352. Immediately following the transmit disable state 322, the secondary device enters a signal detect wait state 354. The secondary device remains in the signal detect wait state 354 until the secondary device receives and detects a synchronization signal from the primary device, as indicated by a signal detection signal (send_s_sigdet) generated by the secondary device. In response to send_s_sigdet indicating detection of the synchronization signal from the primary device, the secondary device transitions into a silent wait state 356 and remains in the silent wait state 356 until the send_s_sigdet indicates the synchronization signal from the primary device is no longer detected.

FIG. 4 is a timing diagram 400 illustrating a send_s_sigdet signal generated by the secondary device in connection with reception of a synchronization signal (SEND_S) from the primary device. The send_s_sigdet signal illustrated in FIG. 4 is generated by signal detection circuitry of the secondary device, for example.

According to the IEEE 802.3ch automotive Ethernet standard, a synchronization signal such as the SEND_S signal discussed above comprises a pseudorandom sequence having a length of 255, which is transmitted 20 times. It has been proposed that the IEEE 802.3cy automotive Ethernet use the same synchronization signal as used in the IEEE 802.3ch automotive Ethernet standard.

In some implementations, signal detection circuitry of the secondary device includes a correlator that is configured to detect the pseudorandom sequence of the SEND_S signal. In the example of FIG. 4, an output of a correlator of the signal detection circuitry begins to rise after reception of the SEND_S signal by the secondary device begins, and eventually the correlator output reaches a threshold. In response to the correlator output reaching the threshold, the signal detection circuitry causes send_s_sigdet to transition from a LOW state to a HIGH state to indicate detection of the SEND_S signal. In response to the correlator output falling back below the threshold, the signal detection circuitry causes the send_s_sigdet to transition from the HIGH state back to the LOW state to indicate detection of the SEND_S signal has ended.

Suitable signal detection circuitry will take at least 363 ns to detect the SEND_S signal after transmission of the SEND_S signal begins. Thus, when the primary device transmits SEND_S signals at intervals of 6.25 μs, the time period from when the SEND_S signal transitions from LOW to HIGH until a start of a next SEND_S transition will be at most 5.887 μs.

In some situations and/or with some signal detection circuitry implementations, the send_s_sigdet transitions back to the LOW state earlier than illustrated in FIG. 3. For example, if the link is noisy and/or experiencing interference, the output of the correlator may drop below the detection threshold prior to transmission of the SEND_S signal ending. As another example, the signal detection circuitry may be designed to generate the send_s_sigdet signal to have a short pulse of a fixed duration rather than having the send_s_sigdet signal stay HIGH until the correlator output drops below the detection threshold.

Figure 5:
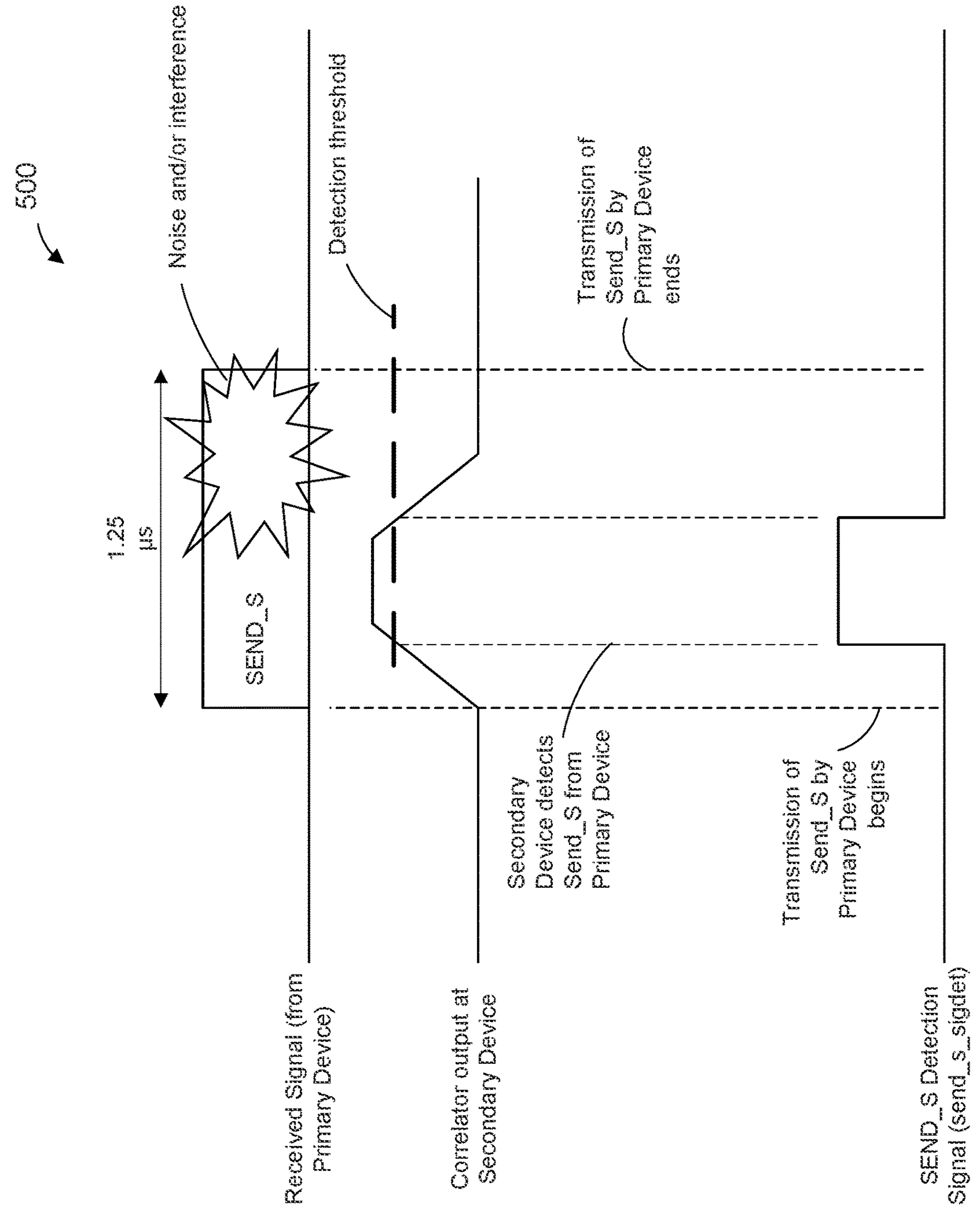
FIG. 5 is a timing diagram illustrating another example of generating a detection signal at a first network interface device in connection with reception of a synchronization signal from a second network interface device while experiencing noise and/or interference.

FIG. 5 is a timing diagram 500 illustrating another scenario of a send_s_sigdet signal generated by the secondary device in connection with reception of a synchronization signal (SEND_S) from the primary device. Like FIG. 4, the output of the correlator of the signal detection circuitry begins to rise after reception of the SEND_S signal by the secondary device begins, and eventually the correlator output reaches a threshold. In response to the correlator output reaching the threshold, the signal detection circuitry causes send_s_sigdet to transition from a LOW state to a HIGH state to indicate detection of the SEND_S signal.

Unlike FIG. 4, however, the link between the primary device and the secondary device experiences noise and/or interference during transmission of the SEND_S signal by the primary device. As result, the correlator output drops below the detection threshold before transmission of the SEND_S signal by the primary device has ended. In response to the correlator output falling back below the threshold, the signal detection circuitry causes the send_s_sigdet to transition from the HIGH state back to the LOW state to indicate detection of the SEND_S signal has ended.

Referring again to FIG. 3, the secondary device remains in the silent wait state 356 until the send_s_sigdet indicates the synchronization signal from the primary device is no longer detected. In response to the send_s_sigdet indicating that the synchronization signal from the primary device is no longer detected, the secondary device transitions to a Tx_Send_S state 358, during which the secondary device sends one or more synchronization response signals (e.g., a SEND_S signal) to the primary device for a defined time period (e.g., proposed to be 1.25 μs±0.05 μs for the IEEE 802.3cy automotive Ethernet standard). When the Tx_Send_S state 358 ends, the secondary device transitions to a pause state 360 during which the secondary device quiets transmissions by the secondary device.

In the scenario illustrated in FIG. 3, the secondary device transitions to Tx_Send_S state 358 prior to the primary device finishing transmission of the SEND_S signal. For example, a scenario such as illustrated in FIG. 5 has occurred. Thus, the secondary device begins transmitting a synchronization response signal to the primary device before the primary device has finished transmitting the SEND_S signal while the primary is in the Tx_Send_S state 312_y_. Thus, the primary device may not detect the synchronization response signal transmitted by the secondary device.

To reduce the probability of the secondary device transmitting a synchronization response signal prior to the primary device ending transmission of the synchronization signal, such as in the scenario illustrated in FIG. 3, the secondary device sets a timer in response to detecting the synchronization signal from the primary device and does not begin transmission of the synchronization response signal until the timer expires, according to some embodiments. Because there is delay between the start of transmission of the synchronization signal by the primary device and when the secondary device first detects the synchronization signal, the timer can be set to a time value that is shorter than a maximum time duration of the synchronization signal from the primary device as specified by a communication protocol. For example, as discussed above with reference to FIGS. 3 and 4 and in the context of the proposed IEEE 802.3cy automotive Ethernet standard, suitable signal detection circuitry at the secondary device will take at least 363 ns to detect the SEND_S signal from the primary device after transmission of the SEND_S signal begins. Additionally, as discussed above with reference to FIGS. 3-5, the proposed IEEE 802.3cy automotive Ethernet standard specifies that the primary device should transmit the SEND_S signal in the Tx_Send_S state 312 for 1.25 μs±0.05 μs (maximum time duration of 1.30 μs). Thus, the timer could be set to as little as 0.937 μs (1.30 μs-363 ns), in some embodiments corresponding to the proposed IEEE 802.3cy automotive Ethernet standard. In some embodiments, the timer is set to between 73% and 90% of the maximum duration of the synchronization signal from the primary device. In other embodiments, the timer is set to between 75% and 85% of the maximum duration of the synchronization signal from the primary device. In other embodiments, the timer is set to between 75% and 80% of the maximum duration of the synchronization signal from the primary device. In an embodiment corresponding to the proposed IEEE 802.3cy automotive Ethernet standard, the timer is set to approximately 1 μs (i.e., 1 μs±0.05 μs).

In other embodiments, the timer is set to a time value that is longer than a maximum time duration of the synchronization signal from the primary device as specified by the communication protocol. In some embodiments, the timer is set to between 105% and 200% of the maximum duration of the synchronization signal from the primary device. In other embodiments, the timer is set to between 110% and 190% of the maximum duration of the synchronization signal from the primary device. In other embodiments, the timer is set to between 120% and 180% of the maximum duration of the synchronization signal from the primary device.

In other embodiments, the timer is set to a time value that is approximately equal (e.g., within 4%) to a maximum time duration of the synchronization signal from the primary device as specified by the communication protocol.

Figure 6:
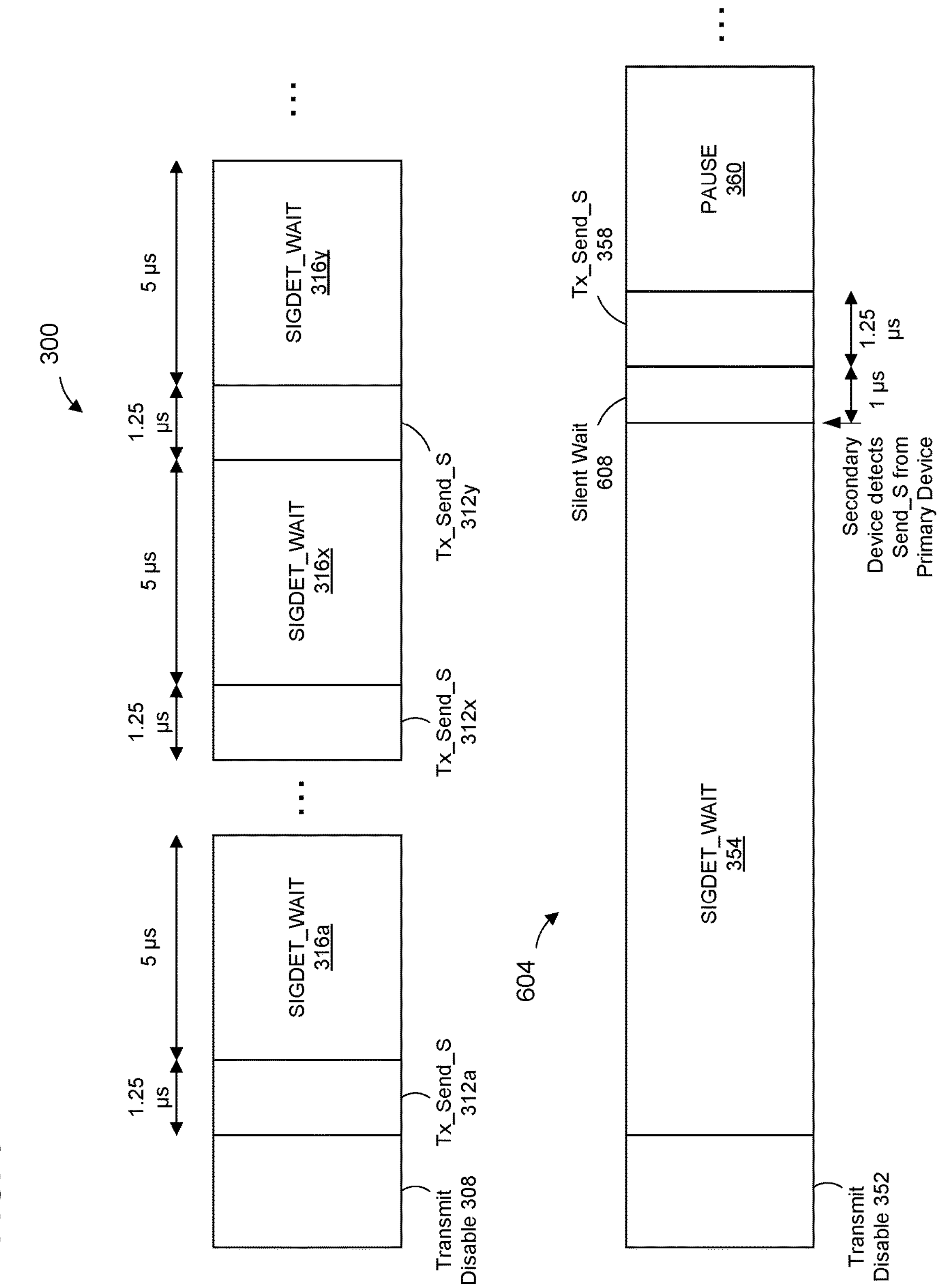
FIG. 6 is a timing/state transition diagram illustrating an example link establishment process, according to an embodiment.

FIG. 6 is a timing/state transition diagram illustrating an example link establishment process, according to an embodiment. FIG. 6 is similar to the timing/state diagram of FIG. 3, and like-numbered elements are not described again in detail for purposes of brevity. For example, the state transition sequence 300 of the primary device is the same as in FIG. 3.

Like the timing/state diagram of FIG. 3, the secondary device remains in the signal detect wait state 354 until the secondary device receives and detects a synchronization signal from the primary device, as indicated by a signal detection signal (send_s_sigdet) generated by the secondary device. In response to send_s_sigdet indicating detection of the synchronization signal from the primary device, the secondary device transitions into a silent wait state 608. In the silent wait state 608, the secondary device sets a timer and remains in the silent wait state 608 until the timer expires. In the embodiment illustrate in FIG. 6, which corresponds to the IEEE 802.3cy automotive Ethernet standard now in development, the secondary device sets the timer to approximately 1 μs (i.e., 1 μs±0.05 μs). In other embodiments, the secondary device sets the timer to another suitable time different that approximately 1 μs. For example, in some embodiments, the timer is set to between 73% and 90% of the maximum duration of the synchronization signal sent by the primary device during the Tx_Send_S state 312. In other embodiments, the timer is set to between 75% and 85% of the maximum duration of the synchronization signal sent by the primary device during the Tx_Send_S state 312. In other embodiments, the timer is set to between 75% and 80% of the maximum duration of the synchronization signal sent by the primary device during the Tx_Send_S state 312. In other embodiments, the timer is set to a time value that is longer than a maximum time duration of the synchronization signal sent by the primary device during the Tx_Send_S state 312. In some embodiments, the timer is set to between 105% and 200% of the maximum duration of the synchronization signal sent by the primary device during the Tx_Send_S state 312. In other embodiments, the timer is set to between 110% and 190% of the maximum duration of the synchronization signal sent by the primary device during the Tx_Send_S state 312. In other embodiments, the timer is set to between 120% and 180% of the maximum duration of the synchronization signal sent by the primary device during the Tx_Send_S state 312.

In response to the timer expiring, the secondary device transitions to a Tx_Send_S state 358, during which the secondary device sends one or more synchronization response signals (e.g., a SEND_S signal) to the primary device for the defined time period (e.g., proposed to be 1.25 μs±0.05 μs for the IEEE 802.3cy automotive Ethernet standard). Because the secondary device does not transition to the Tx_Send_S state 358 until the timer expires, the secondary device begins transmitting the synchronization response signals only after the primary device has ended transmission of synchronization signals (e.g., the SEND_S signal) while in the Tx_Send_S state **312*y*, thus avoiding problems such as discussed with reference to FIGS. 3 and 5**.

When the Tx_Send_S state 608 ends, the secondary device transitions to a pause state 360.

Figure 7:
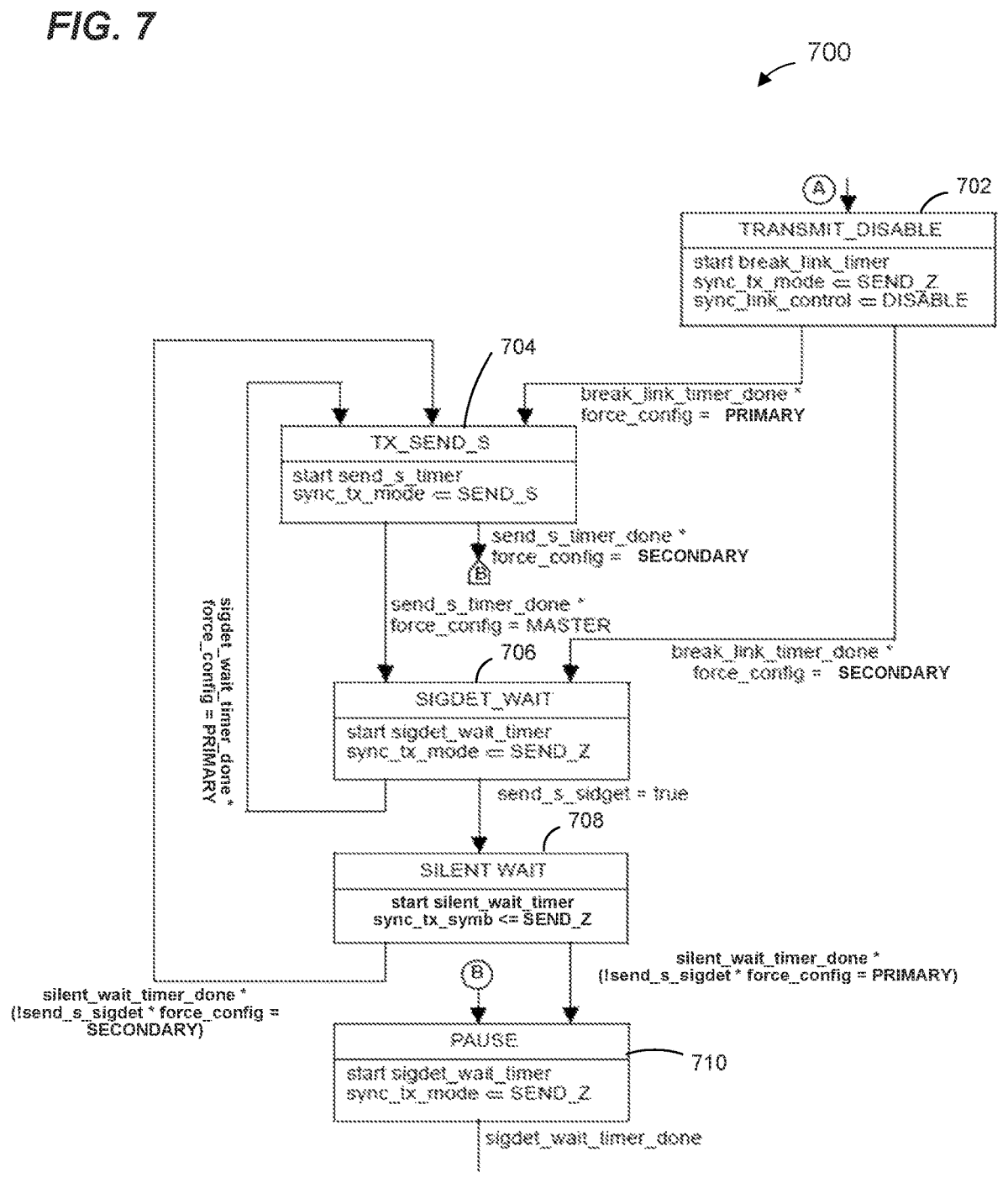

FIG. 7 is a state transition diagram 700 illustrating example states and state transitions for operation during a synchronization procedure performed by a PHY processor, according to another embodiment. In an embodiment, the PHY processors 130, 150 of FIG. 1 are configured to function according to the state diagram 700, and FIG. 7 is generally described with reference to FIG. 1 for ease of explanation. In other embodiments, the PHY processors 130, 150 of FIG. 1 are configured to function according to another suitable state diagram. Additionally, in other embodiments, a suitable PHY processing device other than the PHY processing devices 130, 150 is configured to function according to the state diagram 700.

The state diagram 700 generally corresponds to the state transitions 300 and 604 illustrated in FIG. 6.

Initially, the PHY processor operates in a transmit disable state 702, in an embodiment. The PHY processor enters the transmit disable state 702 upon power-up or upon initiation of a link establishment procedure, in an embodiment. While in the transmit disable state 702, the PHY processor enables various modes and initiates various timers for signal synchronization, in the embodiment. For example, the PHY processor starts a break link timer and sets a transmit mode to a send all zeros (Send_Z) mode so that no transmission is performed, in an embodiment. The PHY processor also disables a synchronization link control mode and initiates a send synchronization signal counter (send_s_counter), in an embodiment. Transition from the transmit disable state 702 to a next state depends on whether the PHY processor is a primary PHY processor (e.g., the primary PHY processor 130) or a secondary PHY processor (e.g., the secondary PHY processor 150), in an embodiment. In a scenario in which the PHY processor is a primary PHY processor (e.g., the primary PHY processor 130), the primary PHY processor 130 transitions from the transmit disable state 702 to a transmit synchronization signal (Tx_Send_S) state 704. In the transmit synchronization signal state 704, the primary PHY processor 130 starts a send signal (Send_S) timer and sets the transmit mode to send synchronization signal (Send_S) for synchronization signal transmission, in an embodiment. The primary PHY processor 130 thus transmits the synchronization signal until expiration of the send signal timer, in an embodiment.

In an embodiment, the send signal timer measures a time duration of approximately 1.25 μs (i.e., 1.25 μs±0.05 μs; i.e., the maximum time duration is 1.30 μs). In another embodiment, the send signal timer measures a time duration of approximately 1 μs (i.e., 1 μs±0.05 μs; i.e., the maximum time duration is 1.05 μs). In other embodiments, the send signal timer measures another suitable time duration. The time duration measured by the send signal timer corresponds to the duration of the synchronization signal, in an embodiment.

Upon expiration of the synchronization signal send timer, the primary PHY processor 130 transitions to a signal detection wait state 706. In the signal detection wait state 706, the primary PHY processor 130 starts a signal detection wait timer and sets the transmit mode to the send all zeros (Send_Z) state so that no transmission is performed by the primary PHY processor 130, in an embodiment.

In an embodiment, the signal detection wait timer measures a time duration of approximately 5 μs (i.e., 5 μs±0.15 μs). In another embodiment, the signal detection wait timer measures a time duration of approximately 4 μs (i.e., 4 μs±0.12 μs; i.e.). In other embodiments, the signal detection wait timer measures another suitable time duration.

With continued reference to the signal detection wait state 706, if, while the primary PHY processor 130 is in the signal detection wait state 706, the primary PHY processor 130 detects a synchronization response signal from the secondary PHY processor 150 (send_s_sigdet=true), then the primary PHY processor 130 transitions to a silent wait state 708. In the silent wait state, the primary PHY processor 130 keeps the transmit mode in the send all zeros (Send_Z) state so that no transmission is performed by the primary PHY processor 130. Additionally, the primary PHY processor 130 starts a silent_wait_timer of the primary PHY processor 130. In an embodiment, the silent_wait_timer is configured to measure a suitable time period such as discussed above. In some embodiments that corresponds to the IEEE 802.3cy automotive Ethernet standard now in development, the primary device sets the silent_wait_timer to approximately 1 μs (i.e., 1 μs±0.05 μs). In other embodiments, the primary device sets the silent_wait_timer to another suitable time different that approximately 1 μs. For example, in some embodiments, the silent_wait_timer is set to between 73% and 90% of the maximum duration of the synchronization signal sent by the primary device during the Tx_Send_S state 704. In other embodiments, the silent_wait_timer is set to between 75% and 85% of the maximum duration of the synchronization signal sent by the primary device during the Tx_Send_S state 704. In other embodiments, the silent_wait_timer is set to between 75% and 80% of the maximum duration of the synchronization signal sent by the primary device during the Tx_Send_S state 704. In other embodiments, the silent_wait_timer is set to a time value that is longer than a maximum time duration of the synchronization signal sent by the primary device during the Tx_Send_S state 704. In some embodiments, the silent_wait_timer is set to between 105% and 200% of the maximum duration of the synchronization signal sent by the primary device during the Tx_Send_S state 704. In other embodiments, the silent_wait_timer is set to between 110% and 190% of the maximum duration of the synchronization signal sent by the primary device during the Tx_Send_S state 704. In other embodiments, the silent_wait_timer is set to between 120% and 180% of the maximum duration of the synchronization signal sent by the primary device during the Tx_Send_S state 704.

In response to the silent_wait_timer expiring and no synchronization response signal from the secondary PHY processor 150 being detected, the primary PHY processor 130 transitions to a pause state 710, in an embodiment. Upon expiration of a signal detect wait timer in the pause state 710, the primary PHY processor 130 transitions to a link good state, in an embodiment.

On the other hand, if, while in the signal detection wait state 706, the primary PHY processor 130 does not detect a synchronization response signal from the secondary PHY processor 150, then the primary PHY processor 130 loops back to the synchronization transmission state 704 and transmits another synchronization signal to the secondary PHY processor 150. The primary PHY processor 130 continues transitioning between the synchronization signal transmission state 704 and the signal detect wait state 706 until the primary PHY processor 130 detects a synchronization response signal from the secondary PHY processor 150 during the signal detect wait state 706, in an embodiment.

Referring back to the transmit disable state 702, in a scenario in which the PHY processor is a secondary PHY processor (e.g., the secondary PHY processor 150), the secondary PHY processor 150 transitions from the transmit disable state 702 to the signal detection wait state 706, in an embodiment. In the signal detection wait state 706, the secondary PHY processor 150 keeps the transmit mode in the send all zeros (Send_Z) state so that no transmission is performed by the secondary PHY processor 150. The secondary PHY processor 150 remains in the signal detect wait state 706 until the secondary PHY processor 150 detects a synchronization signal from the primary PHY processor 130, in an embodiment. In response to detecting a synchronization signal from the PHY processor 130, the secondary PHY processor 150 transitions to the silent wait state 708.

In the silent wait state 708, the secondary PHY processor 150 keeps the transmit mode in the send all zeros (Send_Z) state so that no transmission is performed by the secondary PHY processor 150. Additionally, the secondary PHY processor 150 starts a silent_wait_timer of the secondary PHY processor 150. The silent_wait_timer of the secondary PHY processor 150 is configured to measure a time period such that the secondary PHY processor 150 remains in the silent wait state 708 at least until the primary PHY processor 130 has completed transmitting the synchronization signal that was detected while the secondary PHY processor 150 was in the signal detect wait state 706.

In an embodiment, the silent_wait_timer is configured to measure a suitable time period such as discussed above. In some embodiments that corresponds to the IEEE 802.3cy automotive Ethernet standard now in development, the secondary PHY processor 150 sets the silent_wait_timer to approximately 1 μs (i.e., 1 μs±0.05 μs). In other embodiments, the secondary PHY processor 150 sets the silent_wait_timer to another suitable time different that approximately 1 μs. For example, in some embodiments, the silent_wait_timer is set to between 73% and 90% of the maximum duration of the synchronization signal sent by the primary device during the Tx_Send_S state 704. In other embodiments, the silent_wait_timer is set to between 75% and 85% of the maximum duration of the synchronization signal sent by the primary device during the Tx_Send_S state 704. In other embodiments, the silent_wait_timer is set to between 75% and 80% of the maximum duration of the synchronization signal sent by the primary device during the Tx_Send_S state 704. In other embodiments, the silent_wait_timer is set to a time value that is longer than a maximum time duration of the synchronization signal sent by the primary device during the Tx_Send_S state 704. In some embodiments, the silent_wait_timer is set to between 105% and 200% of the maximum duration of the synchronization signal sent by the primary device during the Tx_Send_S state 704. In other embodiments, the silent_wait_timer is set to between 110% and 190% of the maximum duration of the synchronization signal sent by the primary device during the Tx_Send_S state 704. In other embodiments, the silent_wait_timer is set to between 120% and 180% of the maximum duration of the synchronization signal sent by the primary device during the Tx_Send_S state 704.

In response to the silent_wait_timer expiring and no synchronization signal from the primary PHY processor 130 being detected, the secondary PHY processor 150 transitions to the Tx_Send_S state 704, in an embodiment. In an embodiment, the Tx_Send_S state 704 is generally the same for the secondary PHY processor 150 as for the primary PHY processor 130, in an embodiment. After transmitting the synchronization response signal during the Tx_Send_S state 704, the secondary PHY processor 150 transitions to the pause state 710. Upon expiration of a signal detect wait timer in the pause state 710, the secondary PHY processor 150 transitions to a link good state, in an embodiment.

FIG. 8 is a timing/state transition diagram illustrating another example link establishment process, according to another embodiment. FIG. 8 is similar to the timing/state diagram of FIG. 6, and like-numbered elements are not described again in detail for purposes of brevity.

In a state transition sequence 800 of the primary device, many of the elements are the same as in FIGS. 3 and 6. After the silent wait state 316, the primary device transitions to a pause state 812. The primary device remains in the pause state 812 for approximately 5 μs and then transitions to a link_good_check state 816.

A state transition sequence 800 of the secondary device also includes elements that are the same as in FIGS. 3 and 6. For example, the secondary device remains in the signal detect wait state 354 until the secondary device receives and detects a synchronization signal from the primary device, as indicated by a signal detection signal (send_s_sigdet) generated by the secondary device. In response to send_s_sigdet indicating detection of the synchronization signal from the primary device, the secondary device transitions into the silent wait state 608. In the silent wait state 608, the secondary device sets a timer and remains in the silent wait state 608 until the timer expires as discussed above.

In response to the timer expiring, the secondary device transitions to a Tx_Send_S state **854*a*, during which the secondary device sends one or more synchronization response signals (e.g., a SEND_S signal) to the primary device for the defined time period (e.g., proposed to be 1.25 μs±0.05 μs for the IEEE 802.3cy automotive Ethernet standard). Because the secondary device does not transition to the Tx_Send_S state 854*a* until the timer expires, the secondary device begins transmitting the synchronization response signals only after the primary device has ended transmission of synchronization signals (e.g., the SEND_S signal) while in the Tx_Send_S state 312*x*, thus avoiding problems such as discussed with reference to FIGS. 3 and 5**.

In an embodiment, upon the timer expiring, the secondary device initiates transmission of a fixed number of synchronization response signals to the primary device during a plurality of Tx_Send_S states 854. In embodiment, the secondary PHY processor 150 enters a wait state 858 (Sigdet_Wait) between transmission of consecutive synchronization response signals 854. In the wait state 858, no transmission is performed by the secondary device, in an embodiment. In an embodiment, the secondary device remains in the wait state 858 for a duration of a pause time period. In an embodiment, the duration of the wait time period is approximately 5 μs (5 μs±0.2 μs). In another embodiment, the secondary wait time period is of a suitable duration different from approximately 5 μs. In an embodiment, transmission of the fixed number of synchronization response signals to the primary device during the Tx_Send_S states 854 increases the probability of detection of a synchronization response signal by the primary device, even in the presence of noise on the link 106. For example, as illustrated in FIG. 8, if the primary device misses detection of one or more initial synchronization response signals due, for example, to transient noise on the link 106, the primary device will detect a subsequent synchronization response signal, in an embodiment.

After the secondary device transmits the fixed number of synchronization response signals to the primary device during a plurality of Tx_Send_S states 854, the secondary device transitions to a pause state 862 and then transitions to a link_good_check state 866.

FIG. 9 is a state transition diagram 900 illustrating example states and state transitions for operation during a synchronization procedure performed by a PHY processor, according to another embodiment. In an embodiment, the PHY processors 130, 150 of FIG. 1 are configured to function according to the state diagram 900, and FIG. 9 is generally described with reference to FIG. 1 for ease of explanation. In other embodiments, the PHY processors 130, 150 of FIG. 1 are configured to function according to another suitable state diagram. Additionally, in other embodiments, a suitable PHY processing device other than the PHY processing devices 130, 150 is configured to function according to the state diagram 900.

The state diagram 900 generally corresponds to the state transitions 800 and 850 illustrated in FIG. 8.

The state diagram 900 is similar to the state diagram 700 of FIG. 7, and like-numbered elements are not discussed again in detail for purposes of brevity.

Initially, the PHY processor operates in a transmit disable state 902, which is similar to the transmit disable state 702 of FIG. 7, in an embodiment. While in the transmit disable state 902, the PHY processor enables various modes and initiates various timers for signal synchronization, in the embodiment. For example, the PHY processor initiates a send synchronization signal counter (send_s_counter), in an embodiment.

Transition from the transmit disable state 902 to a next state depends on whether the PHY processor is a primary PHY processor (e.g., the primary PHY processor 130) or a secondary PHY processor (e.g., the secondary PHY processor 150), in an embodiment. In a scenario in which the PHY processor is a primary PHY processor (e.g., the primary PHY processor 130), the primary PHY processor 130 transitions from the transmit disable state 902 to a transmit synchronization signal (Tx_Send_S) state 904. In the transmit synchronization signal state 904, the primary PHY processor 130 starts a send signal (send_s) timer and sets the transmit mode to send synchronization signal (Send_S) for synchronization signal transmission, in an embodiment. The primary PHY processor 130 thus transmits the synchronization signal until expiration of the send signal timer, in an embodiment.

In an embodiment, the send signal timer measures a time duration of approximately 1.25 μs (i.e., 1.25 μs±0.05 μs; i.e., the maximum time duration is 1.30 μs). In another embodiment, the send signal timer measures a time duration of approximately 1 μs (i.e., 1 μs±0.05 μs; i.e., the maximum time duration is 1.05 μs). In other embodiments, the send signal timer measures another suitable time duration. The time duration measured by the send signal timer corresponds to the duration of the synchronization signal, in an embodiment.

Upon expiration of the synchronization signal send timer, the primary PHY processor 130 transitions to a signal detection wait state 906. In the signal detection wait state 906, the primary PHY processor 130 starts a signal detection wait timer and sets the transmit mode to the send all zeros (Send_Z) state so that no transmission is performed by the primary PHY processor 130, in an embodiment.

In an embodiment, the signal detection wait timer measures a time duration of approximately 5 μs (i.e., 5 μs±0.15 μs). In another embodiment, the signal detection wait timer measures a time duration of approximately 4 μs (i.e., 4 μs±0.12 μs; i.e.). In other embodiments, the signal detection wait timer measures another suitable time duration.

With continued reference to the signal detection wait state 906, if, while the primary PHY processor 130 is in the signal detection wait state 906, the primary PHY processor 130 detects a synchronization response signal from the secondary PHY processor 150 (send_s_sigdet=true), then the primary PHY processor 130 transitions to the silent wait state 708 discussed above.

If, while in the signal detection wait state 906, the primary PHY processor 130 does not detect a synchronization response signal from the secondary PHY processor 150, then the primary PHY processor 130 loops back to the synchronization transmission state 904 and transmits another synchronization signal to the secondary PHY processor 150. The primary PHY processor 130 continues transitioning between the synchronization signal transmission state 904 and the signal detect wait state 906 until the primary PHY processor 130 detects a synchronization response signal from the secondary PHY processor 150 during the signal detect wait state 906, in an embodiment.

Referring back to the transmit disable state 902, in a scenario in which the PHY processor is a secondary PHY processor (e.g., the secondary PHY processor 150), the secondary PHY processor 150 sets a counter (send_s_counter) to zero. Additionally, the secondary PHY processor 150 transitions from the transmit disable state 902 to the signal detection wait state 906, in an embodiment. In the signal detection wait state 906, the secondary PHY processor 150 keeps the transmit mode in the send all zeros (Send_Z) state so that no transmission is performed by the secondary PHY processor 150. The secondary PHY processor 150 remains in the signal detect wait state 906 until the secondary PHY processor 150 detects a synchronization signal from the primary PHY processor 130, in an embodiment. In response to detecting a synchronization signal from the PHY processor 130, the secondary PHY processor 150 transitions to the silent wait state 708.

In response to the silent_wait_timer expiring and no synchronization signal from the primary PHY processor 130 being detected, the secondary PHY processor 150 transitions to the Tx_Send_S state 904, in an embodiment. In an embodiment, the Tx_Send_S state 904 is similar for the secondary PHY processor 150 as for the primary PHY processor 130 and involves sending a synchronization signal. Additionally, the secondary PHY processor 150 increments the send_s_counter and determines whether the send_s_counter has reached an end value (min_send_s_count) that corresponds to the transmission of a minimum number of synchronization response signals to the primary PHY device 130, according to an embodiment.

If the send_s_counter has not yet reached the end value, the secondary PHY processor 150 transitions to the signal detection wait state 906. The secondary PHY processor 150 remains in the signal detection wait state 906 until the sigdet_wait_timer expires and then returns to the Tx_Send_S state 904. Thus, the secondary PHY processor 150 alternates between the Tx_Send_S state 904 and the signal detection wait state 906 and transmits the minimum number of synchronization response signals to the primary PHY device 130.

When the secondary PHY processor 150 determines that the minimum number of synchronization response signals has been transmitted to the primary PHY device 130, the secondary PHY processor 150 transitions to the pause state 710 that was discussed above.

FIG. 10 is a flow diagram of an example method 1000 for synchronizing a first network interface device and a second network interface device that are communicatively coupled via a communication link, according to an embodiment. The method 1000 is implemented by a secondary device, such as the secondary PHY processor 150 of FIG. 1, in an embodiment. For ease of explanation, the method 1000 is described herein in the context of the first network interface device being a secondary device (sometimes referred to herein as a "secondary network interface device") and the second network interface device being a primary device (sometimes referred to herein as a "primary network interface device").

In an embodiment, the method 1000 is implemented by a network interface device configured to implement the state machine 700 of FIG. 7 and is performed in conjunction with operation of the state machine 700. In another embodiment, the method 1000 is implemented by a network interface device configured to implement the state machine 900 of FIG. 9 and is performed in conjunction with operation of the state machine 900. In other embodiments, the method 1000 is implemented by a network interface device configured to implement another suitable state machine different than the state machine 700 and the state machine 900, and is performed in conjunction with operation of the other suitable state machine.

At block 1004, the first network interface device receives (e.g., the secondary network interface device 104 receives, the secondary PHY processor 150 receives, etc.) a first synchronization signal transmitted by the second network interface device (e.g., the primary network interface device 102, the primary PHY processor 130, etc.). In an embodiment, the first synchronization signal is for synchronizing the first network interface device and the second network interface device via the communication link. In various embodiments, the first network interface device receives the synchronization signal 210 of FIG. 2, the synchronization signal corresponding to any of the Tx_Send_S state 312 of FIGS. 6 and 8, the Tx_Send_S state 704 of FIG. 7, the Tx_Send_S state 904 of FIG. 9, etc. In other embodiments, the first network interface device receives another suitable first synchronization signal.

At block 1008, in response to the first network interface device detecting the first synchronization signal from the second network interface device, the first network interface device starts a timer of the first network interface device. For example, the network interface device 104 starts (e.g., PHY processor 150 starts, the link synchronization controller 192 starts, etc.) the timer 196. The timer is configured to expire after transmission of the first synchronization signal from the second network interface device ends.

In an embodiment, the timer is configured to measure a first time duration that is less than a second time duration of the first synchronization signal and takes into account a delay from when the first network interface device begins receiving the first synchronization signal and when first network interface device detects the first synchronization signal.

In an embodiment, a maximum duration of the first synchronization signal is specified by a communication protocol. In some embodiments, the timer is set to between 73% and 90% of the maximum duration of the first synchronization signal. In other embodiments, the timer is set to between 75% and 85% of the maximum duration of the first synchronization signal. In other embodiments, the timer is set to between 75% and 80% of the maximum duration of the first synchronization signal. In an embodiment corresponding to the proposed IEEE 802.3cy automotive Ethernet standard, the timer is set to approximately 1 μs (i.e., 1 μs±0.05 μs).

In other embodiments, the timer is set to a time value that is longer than the maximum time duration of the first synchronization signal. In some embodiments, the timer is set to between 105% and 200% of the maximum duration of the first synchronization signal. In other embodiments, the timer is set to between 110% and 190% of the maximum duration of the first synchronization signal. In other embodiments, the timer is set to between 120% and 180% of the maximum duration of the first synchronization signal.

In some embodiments, the timer started at block 1008 corresponds to the silent_wait_timer of state 708 (FIG. 7 and/or FIG. 9).

At block 1012, in response to the timer expiring, the first network interface device transmits one or more synchronization response signals to the second network interface device. In various embodiments, the first network interface device transmits the synchronization response signal 212 of FIG. 2, the synchronization signal corresponding to any of the Tx_Send_S state 358 of FIG. 6, the Tx_Send_S state 854*a* of FIG. 8, the Tx_Send_S state 704 of FIG. 7, the Tx_Send_S state 904 of FIG. 9, etc. In other embodiments, the first network interface device transmits another suitable synchronization response signal.

At block 1016, after transmission of the synchronization response signal at block 1012, the first network interface device receives a second synchronization signal from the second network interface device. Reception of the second synchronization signal from the second network interface device at block 1016, after transmission of the synchronization response signal at block 1012, generally signifies that the second network interface device missed detection of the synchronization response signal transmitted at block 1012, in an embodiment.

In an embodiment, the first network interface device receives a synchronization signal corresponding to the Tx_Send_S state 312*y* of FIG. 8, etc. In other embodiments, the first network interface device receives another suitable synchronization signal.

At block 1020, after receiving the second synchronization signal from the second network interface device, the first network interface device transmits additional synchronization response signals to the second network interface device until a minimum number of synchronization response signals are transmitted by the first network interface device to the second network interface device. In an embodiment, blocks 1012 and 1020 correspond to the first network interface device transmitting a predetermined fixed number of synchronization response signals to the second network interface device, and the first network interface device continues transmission of synchronization response signals to the second network interface device at block 1020 without restarting transmission of the predetermined fixed number of synchronization response signals. Continuing transmission of synchronization response signals to the second network interface device without restarting transmission of the predetermined fixed number of synchronization response signals ensures that the transmission of the predetermined fixed number of synchronization response signals is not restarted due to a false detection of a synchronization signal from the second network interface device after transmission of one or more initial synchronization signals to the second network interface device, in an embodiment.

In some embodiments, blocks 1016 and/or 1020 are omitted.

Embodiment 1: A method for synchronizing a first network interface device and a second network interface device via a communication link, the method comprising: receiving, at the first network interface device, a first synchronization signal transmitted by the second network interface device, the first synchronization signal being for synchronizing the first network interface device and the second network interface device via the communication link; in response to detecting the first synchronization signal from the second network interface device, starting a timer of the first network interface device, the timer being configured to expire after transmission of the first synchronization signal by the second network interface device has ended; and in response to the timer expiring, transmitting, by the first network interface device, a synchronization response signal to the second network interface device.

Embodiment 2: The method of embodiment 1, wherein: a maximum duration of the first synchronization signal is defined by a communication protocol; and the timer is configured to measure a time duration that is less than the maximum duration of the first synchronization signal.

Embodiment 3: The method of either of embodiments 1 or 2, wherein the timer is configured to take into account a delay between when reception of the first synchronization signal by the first network interface device begins and when the first network interface detects the first synchronization signal.

Embodiment 4: The method of embodiment 2, wherein the timer is configured to measure a time duration between 73% and 90% of the maximum duration of the first synchronization signal defined by the communication protocol.

Embodiment 5: The method of embodiment 4, wherein the timer is configured to measure a time duration between 75% and 85% of the maximum duration of the first synchronization signal defined by the communication protocol.

Embodiment 6: The method of embodiment 5, wherein the timer is configured to measure a time duration between 75% and 80% of the maximum duration of the first synchronization signal defined by the communication protocol.

Embodiment 7: The method of any of embodiments 2 and 4-6, wherein: the communication protocol defines the maximum duration of the first synchronization signal as 1.3 μs; and the timer is configured to measure a time duration of approximately 1 μs.

Embodiment 8: The method of any of embodiments 1-7, further comprising: after transmitting the synchronization response signal, receiving at the first network device a second synchronization signal from the second network interface device; and after receiving the second synchronization signal, transmitting, by the first network interface device, a plurality of additional synchronization response signals to the second network interface device until a minimum number of synchronization response signals are transmitted by the first network interface device to the second network interface device.

Embodiment 9: The method of embodiment 8, further comprising: initializing a send synchronization signal counter at the first network interface device; and incrementing the send synchronization signal counter for each transmission of a respective synchronization response signals to the second network interface device; wherein transmitting the plurality of additional synchronization response signals comprises transmitting additional synchronization response signals until the send synchronization signal counter reaches a fixed predetermined number corresponding to the minimum number of synchronization response signals.

Embodiment 10: The method of either of embodiments 8 or 9, wherein transmitting synchronization response signals includes pausing transmission after respective ones of synchronization response signals, among the synchronization response signals, for a duration of a pause time.

Embodiment 11: A communication device, comprising: a first network interface device configured to communicatively couple with a second network interface device via a communication link, the first network interface device comprising a physical layer (PHY) processor, implemented at least partially on one or more integrated circuit (IC) chips, the PHY processor including a timer implemented on the one or more IC chips. The one or more IC chips are configured to: receive a first synchronization signal transmitted by the second network interface device, the first synchronization signal being for synchronizing the first network interface device and the second network interface device via the communication link; in response to detecting the first synchronization signal from the second network interface device, start the timer of the first network interface device, the timer being configured to expire after transmission of the first synchronization signal by the second network interface device has ended; and in response to the timer expiring, control the first network interface device to transmit a synchronization response signal to the second network interface device.

Embodiment 12: The communication device of embodiment 11, wherein: a maximum duration of the first synchronization signal is defined by a communication protocol; and the timer is configured to measure a time duration that is less than the maximum duration of the first synchronization signal.

Embodiment 13: The communication device of either of embodiments 12 or 13, wherein the timer is configured to take into account a delay between when reception of the first synchronization signal by the first network interface device begins and when the first network interface detects the first synchronization signal.

Embodiment 14: The communication device of embodiment 12, wherein the timer is configured to measure a time duration between 73% and 90% of the maximum duration of the first synchronization signal defined by the communication protocol.

Embodiment 15: The communication device of embodiment 14, wherein the timer is configured to measure a time duration between 75% and 85% of the maximum duration of the first synchronization signal defined by the communication protocol.

Embodiment 16: The communication device of embodiment 15, wherein the timer is configured to measure a time duration between 75% and 80% of the maximum duration of the first synchronization signal defined by the communication protocol.

Embodiment 17: The communication device of any of embodiments 12 and 14-16, wherein: the communication protocol defines the maximum duration of the first synchronization signal as 1.3 μs; and the timer is configured to measure a time duration of approximately 1 μs.

Embodiment 18: The communication device of any of embodiments 11-17, wherein the one or more IC chips are further configured to: after the first network interface device transmits the synchronization response signal, receive a second synchronization signal from the second network interface device; and after receiving the second synchronization signal, control the first network interface device to transmit a plurality of additional synchronization response signals to the second network interface device until a minimum number of synchronization response signals are transmitted by the first network interface device to the second network interface device.

Embodiment 19: The communication device of embodiment 18, wherein: the PHY processor further includes a send synchronization signal counter implemented on the one or more IC chips; and the one or more IC chips are further configured to: initialize the send synchronization signal counter, increment the send synchronization signal counter for each transmission of a respective synchronization response signals to the second network interface device, and transmit the additional synchronization response signals until the send synchronization signal counter reaches a fixed predetermined number corresponding to the minimum number of synchronization response signals.

Embodiment 20: The communication device of either of embodiments 18 or 19, wherein the one or more IC chips are further configured to: pause transmission by the first network interface device after transmission of respective ones of synchronization response signals, among the synchronization response signals, for a duration of a pause time.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present disclosure has been described with reference to specific examples, which are intended to be illustrative only and not to be limiting of the invention, changes, additions and/or deletions may be made to the disclosed embodiments without departing from the scope of the invention.

What is claimed is:

1. A method for synchronizing a first network interface device and a second network interface device via a wired communication link, the method comprising:

receiving, at the first network interface device, a first synchronization signal transmitted by the second network interface device via the wired communication link, the first synchronization signal to facilitate the first network device to discover the second network device and for synchronizing the first network interface device and the second network interface device via the wired communication link;

in response to detecting the first synchronization signal from the second network interface device, starting a timer of the first network interface device, the timer being configured to expire after transmission of the first synchronization signal by the second network interface device has ended; and in response to the timer expiring, transmitting, by the first network interface device, a synchronization response signal to the second network interface device via the wired communication link to facilitate the second network device to discover the first network device, wherein transmitting the synchronization response signal in response to the timer expiring is to mitigate the second network device failing to detect the synchronization response signal due to transmission of the synchronization response signal overlapping in time with transmission of the first synchronization signal.

2. The method of claim 1, wherein:

a maximum duration of the first synchronization signal is defined by a communication protocol; and the timer is configured to measure a time duration that is less than the maximum duration of the first synchronization signal.

3. The method of claim 2, wherein the timer is configured to take into account a delay between when reception of the first synchronization signal by the first network interface device begins and when the first network interface detects the first synchronization signal.

4. The method of claim 2, wherein the timer is configured to measure a time duration between 73% and 90% of the maximum duration of the first synchronization signal defined by the communication protocol.

5. The method of claim 4, wherein the timer is configured to measure a time duration between 75% and 85% of the maximum duration of the first synchronization signal defined by the communication protocol.

6. The method of claim 5, wherein the timer is configured to measure a time duration between 75% and 80% of the maximum duration of the first synchronization signal defined by the communication protocol.

7. The method of claim 2, wherein:

the communication protocol defines the maximum duration of the first synchronization signal as 1.3 μs; and the timer is configured to measure a time duration of approximately 1 μs.

8. The method of claim 1, further comprising:

after transmitting the synchronization response signal, receiving at the first network device a second synchronization signal from the second network interface device; and after receiving the second synchronization signal, transmitting, by the first network interface device, a plurality of additional synchronization response signals to the second network interface device until a minimum number of synchronization response signals are transmitted by the first network interface device to the second network interface device.

9. The method of claim 8, further comprising:

initializing a send synchronization signal counter at the first network interface device; and incrementing the send synchronization signal counter for each transmission of a respective synchronization response signals to the second network interface device;

wherein transmitting the plurality of additional synchronization response signals comprises transmitting additional synchronization response signals until the send synchronization signal counter reaches a fixed predetermined number corresponding to the minimum number of synchronization response signals.

10. The method of claim 8, wherein transmitting synchronization response signals includes pausing transmission after respective ones of synchronization response signals, among the synchronization response signals, for a duration of a pause time.

11. A communication device, comprising:

a first network interface device configured to communicatively couple with a second network interface device via a wired communication link, the first network interface device comprising a physical layer (PHY) processor, implemented at least partially on one or more integrated circuit (IC) chips, the PHY processor including a timer implemented on the one or more IC chips, the one or more IC chips being configured to:

receive a first synchronization signal transmitted by the second network interface device via the wired communication link, the first synchronization signal to facilitate the first network interface device to discover the second network interface device and for synchronizing the first network interface device and the second network interface device via the wired communication link, in response to detecting the first synchronization signal from the second network interface device, start the timer of the first network interface device, the timer being configured to expire after transmission of the first synchronization signal by the second network interface device has ended, and in response to the timer expiring, control the first network interface device to transmit a synchronization response signal to the second network interface device via the wired communication link to facilitate the second network interface device to discover the first network interface device, wherein transmitting the synchronization response signal in response to the timer expiring is to mitigate the second network interface device failing to detect the synchronization response signal due to transmission of the synchronization response signal overlapping in time with transmission of the first synchronization signal.

12. The communication device of claim 11, wherein:

a maximum duration of the first synchronization signal is defined by a communication protocol; and the timer is configured to measure a time duration that is less than the maximum duration of the first synchronization signal.

13. The communication device of claim 12, wherein the timer is configured to take into account a delay between when reception of the first synchronization signal by the first network interface device begins and when the first network interface detects the first synchronization signal.

14. The communication device of claim 12, wherein the timer is configured to measure a time duration between 73% and 90% of the maximum duration of the first synchronization signal defined by the communication protocol.

15. The communication device of claim 14, wherein the timer is configured to measure a time duration between 75% and 85% of the maximum duration of the first synchronization signal defined by the communication protocol.

16. The communication device of claim 15, wherein the timer is configured to measure a time duration between 75% and 80% of the maximum duration of the first synchronization signal defined by the communication protocol.

17. The communication device of claim 12, wherein:

the communication protocol defines the maximum duration of the first synchronization signal as 1.3 μs; and the timer is configured to measure a time duration of approximately 1 μs.

18. The communication device of claim 11, wherein the one or more IC chips are further configured to:

after the first network interface device transmits the synchronization response signal, receive a second synchronization signal from the second network interface device; and after receiving the second synchronization signal, control the first network interface device to transmit a plurality of additional synchronization response signals to the second network interface device until a minimum number of synchronization response signals are transmitted by the first network interface device to the second network interface device.

19. The communication device of claim 18, wherein:

the PHY processor further includes a send synchronization signal counter implemented on the one or more IC chips; and the one or more IC chips are further configured to:

initialize the send synchronization signal counter, increment the send synchronization signal counter for each transmission of a respective synchronization response signals to the second network interface device, and transmit the additional synchronization response signals until the send synchronization signal counter reaches a fixed predetermined number corresponding to the minimum number of synchronization response signals.

20. The communication device of claim 18, wherein the one or more IC chips are further configured to:

pause transmission by the first network interface device after transmission of respective ones of synchronization response signals, among the synchronization response signals, for a duration of a pause time.

* * * * *